(12) United States Patent
Vallee et al.

(10) Patent No.: US 10,539,243 B2
(45) Date of Patent: Jan. 21, 2020

(54) ANTI-DRAIN VALVE ASSEMBLY WITH INTEGRATED FIXATION FUNCTION

(71) Applicant: DANA CANADA CORPORATION, Oakville (CA)

(72) Inventors: Rodolphe Vallee, Noyon (FR); Bernhard Ollier, Cologne (DE); Mathias Perus, Saint-Quentin (FR)

(73) Assignee: Dana Canada Corporation, Oakville, Ontario (CA)

( * ) Notice: Subject to any disclaimer, the term of this patent is extended or adjusted under 35 U.S.C. 154(b) by 180 days.

(21) Appl. No.: 15/752,607

(22) PCT Filed: Aug. 12, 2016

(86) PCT No.: PCT/CA2016/050949
§ 371 (c)(1),
(2) Date: Feb. 14, 2018

(87) PCT Pub. No.: WO2017/027963
PCT Pub. Date: Feb. 23, 2017

(65) Prior Publication Data
US 2018/0238458 A1 Aug. 23, 2018

Related U.S. Application Data

(60) Provisional application No. 62/205,399, filed on Aug. 14, 2015.

(51) Int. Cl.
*F16K 15/02* (2006.01)
*F28D 9/00* (2006.01)
(Continued)

(52) U.S. Cl.
CPC ............ *F16K 15/026* (2013.01); *F01P 11/08* (2013.01); *F16K 15/063* (2013.01);
(Continued)

(58) Field of Classification Search
CPC .... F16K 15/026; F16K 27/0209; F01P 11/08; F28D 9/005; F28D 2021/0089; F28F 2280/06; Y10S 285/921; Y10S 277/925
(Continued)

(56) References Cited

U.S. PATENT DOCUMENTS 3,000,506 A 9/1961 Hultgren
4,051,031 A 9/1977 Suzuki
(Continued)

FOREIGN PATENT DOCUMENTS

CN 10287556 A 12/2011
CN 102345776 A 2/2012
(Continued)

OTHER PUBLICATIONS

Chinese Office Action dated Jan. 30, 2019 issued in Application No. 201610922565.4.
(Continued)

*Primary Examiner* — Marina A Tietjen
*Assistant Examiner* — Frederick D Soski
(74) *Attorney, Agent, or Firm* — Ridout & Maybee LLP

(57) ABSTRACT

An anti-drain valve for a plate cooler has a plastic housing having a generally cylindrical outer wall with open ends, and an inner support structure integrally formed therewith, and with a valve seat. A piston is located within the support structure and axially movable toward and away from the valve seat. A biasing member biases the piston toward the valve seat. A resilient sealing element provides a seal between the housing and the base plate. The outer wall has first and second portions, the first portion including a plurality of inwardly bendable detents defined by slots through the outer wall for attaching the valve to the base plate of the plate cooler.

19 Claims, 15 Drawing Sheets

(51) Int. Cl.
*F16K 15/06* (2006.01)
*F16K 27/02* (2006.01)
*F01P 11/08* (2006.01)
*F28D 21/00* (2006.01)

(52) U.S. Cl.
CPC .......... *F16K 27/0209* (2013.01); *F28D 9/005* (2013.01); *F28D 2021/0089* (2013.01); *F28F 2280/06* (2013.01); *Y10S 277/925* (2013.01); *Y10S 285/921* (2013.01)

(58) Field of Classification Search
USPC ........................................................ 251/904
See application file for complete search history.

(56) References Cited

U.S. PATENT DOCUMENTS

| | | | | |
|---|---|---|---|---|
| 4,140,148 A * | 2/1979 | Richter | ............. | B65D 51/1644 137/240 |
| 4,159,103 A * | 6/1979 | Jordan | ............. | F16K 31/445 251/284 |
| 4,322,290 A | 3/1982 | Carl | | |
| 4,575,133 A * | 3/1986 | Nattel | ............. | F16L 25/0045 285/192 |
| 4,711,472 A * | 12/1987 | Schnell | ............. | F16L 25/0045 174/153 G |
| 4,735,440 A * | 4/1988 | Sauer | ............. | F01P 11/04 285/110 |
| 4,750,707 A * | 6/1988 | Johncox | ............. | F16K 5/0414 251/286 |
| 4,862,913 A * | 9/1989 | Wildfang | ............. | F16K 15/063 137/543 |
| 4,878,900 A * | 11/1989 | Sundt | ............. | A61M 1/0039 604/119 |
| 4,909,477 A * | 3/1990 | Heiman | ............. | B60T 11/103 251/284 |
| 5,014,964 A * | 5/1991 | Weber | ............. | B60H 1/34 251/209 |
| 5,088,521 A * | 2/1992 | Johnson | ............. | E21B 21/01 137/516.29 |
| 5,092,361 A * | 3/1992 | Masuyama | ............. | F16K 15/026 137/543.21 |
| 5,094,482 A * | 3/1992 | Petty | ............. | B29C 45/4407 285/319 |
| 5,242,011 A | 9/1993 | Hesse | | |
| 5,250,176 A | 10/1993 | Daniel | | |
| 5,881,757 A * | 3/1999 | Kuster | ............. | G05D 16/0608 137/15.19 |
| 5,911,403 A * | 6/1999 | deCler | ............. | B67D 1/0835 137/614.03 |
| 6,978,801 B2 * | 12/2005 | Takahashi | ............. | F16K 15/026 137/538 |
| 7,249,788 B2 * | 7/2007 | Muhammad | ............. | F16L 37/092 285/243 |
| 7,703,702 B2 * | 4/2010 | Strong | ............. | B05B 7/1272 137/852 |
| 7,854,256 B2 | 12/2010 | Pineo et al. | | |
| 8,123,143 B2 | 2/2012 | Willers et al. | | |
| 8,166,996 B2 * | 5/2012 | Canfield | ............. | E03D 1/00 137/389 |
| 8,231,793 B2 | 7/2012 | Hacker et al. | | |
| 8,360,088 B2 | 1/2013 | Nishi et al. | | |
| 8,573,249 B2 | 11/2013 | Min et al. | | |
| 8,795,256 B1 * | 8/2014 | Smith | ............. | A61M 39/26 604/249 |
| 8,997,782 B2 * | 4/2015 | Bostwick | ............. | F02M 37/0076 137/513.5 |
| 9,283,344 B2 * | 3/2016 | Sheffer | ............. | A61M 16/0816 |
| 9,523,453 B2 * | 12/2016 | Arnold | ............. | F16L 37/0982 |
| 9,752,714 B2 * | 9/2017 | Ira | ............. | F16L 37/32 |
| 10,006,577 B2 * | 6/2018 | Meister | ............. | F16L 37/0985 |
| 10,012,335 B2 * | 7/2018 | Dude | ............. | F16L 37/0985 |
| 10,018,293 B2 * | 7/2018 | Tiberghien | ............. | F16L 37/098 |
| 10,344,879 B2 * | 7/2019 | Masaki | ............. | F16K 27/0227 |
| 2002/0062861 A1 * | 5/2002 | Devall | ............. | B60K 15/03504 137/202 |
| 2003/0136800 A1 * | 7/2003 | Brand | ............. | A61M 15/009 222/183 |
| 2005/0045227 A1 * | 3/2005 | Frohwein | ............. | F16K 24/04 137/202 |
| 2005/0082828 A1 * | 4/2005 | Wicks | ............. | A61M 39/105 285/319 |
| 2005/0126633 A1 * | 6/2005 | Leonhardt | ............. | B60K 15/03519 137/202 |
| 2006/0016491 A1 * | 1/2006 | Rosko | ............. | F16K 11/0787 137/625.4 |
| 2006/0196556 A1 * | 9/2006 | Johnson | ............. | F16K 15/063 137/542 |
| 2006/0196557 A1 * | 9/2006 | Niki | ............. | F16K 15/026 137/543.23 |
| 2007/0001452 A1 * | 1/2007 | Friel | ............. | F16B 21/02 285/319 |
| 2007/0066965 A1 * | 3/2007 | Coambs | ............. | A61M 39/26 604/533 |
| 2008/0067807 A1 * | 3/2008 | deCler | ............. | A61M 39/18 285/81 |
| 2009/0014679 A1 * | 1/2009 | Hygema | ............. | B65D 83/38 251/368 |
| 2009/0025808 A1 * | 1/2009 | Kacik | ............. | F16K 11/0787 137/625 |
| 2009/0032128 A1 * | 2/2009 | Tucker | ............. | F16K 11/0787 137/625 |
| 2009/0057218 A1 * | 3/2009 | Hanase | ............. | B01D 35/147 210/230 |
| 2009/0090661 A1 * | 4/2009 | Tanner | ............. | C02F 1/003 210/87 |
| 2010/0001516 A1 * | 1/2010 | Pisula, Jr. | ............. | F16L 37/0982 285/311 |
| 2010/0126625 A1 * | 5/2010 | Berghorst | ............. | B60K 15/04 141/348 |
| 2010/0186690 A1 * | 7/2010 | Wolck | ............. | F01L 1/32 123/90.3 |
| 2011/0121035 A1 * | 5/2011 | Greter | ............. | A61C 9/0026 222/145.1 |
| 2012/0008882 A1 * | 1/2012 | Justice | ............. | B41J 2/175 383/43 |
| 2012/0119485 A1 * | 5/2012 | Cichorek | ............. | F16L 37/0982 285/81 |
| 2012/0286185 A1 * | 11/2012 | Spolski | ............. | F16L 37/413 251/367 |
| 2013/0319634 A1 * | 12/2013 | Sheppard | ............. | F28F 27/00 165/96 |
| 2014/0020774 A1 | 1/2014 | Miklo | | |
| 2014/0116648 A1 * | 5/2014 | Cho | ............. | F28F 27/02 165/96 |
| 2014/0124065 A1 * | 5/2014 | Dang | ............. | F16K 15/063 137/528 |
| 2014/0150739 A1 * | 6/2014 | Kim | ............. | F01P 7/165 123/41.33 |
| 2014/0230927 A1 * | 8/2014 | Schultz | ............. | A47K 5/12 137/511 |
| 2014/0311593 A1 * | 10/2014 | Fawcett | ............. | F16K 17/043 137/470 |
| 2015/0059897 A1 | 3/2015 | Peterson | | |
| 2015/0107776 A1 * | 4/2015 | Schubert | ............. | H02G 1/14 156/433 |
| 2015/0129164 A1 | 5/2015 | Ollier | | |
| 2016/0362244 A1 * | 12/2016 | Sahlstrom | ............. | B65D 83/32 |

FOREIGN PATENT DOCUMENTS

| | | | |
|---|---|---|---|
| CN | 103403421 A | 11/2013 | |
| CN | 104380028 A | 2/2015 | |
| CN | 104395685 A | 3/2015 | |
| CN | 206320357 U | 7/2017 | |
| DE | 19960203 A1 | 6/2001 | |
| DE | 202012007775 U1 * | 10/2012 | ............. F28F 9/00 |
| EP | 1350551 B1 | 5/2006 | |

(56) References Cited

FOREIGN PATENT DOCUMENTS

EP          2305360 B1      7/2012
GB          2279725 A       1/1995
WO      2017/027963 A1      2/2017

OTHER PUBLICATIONS

European Patent Office, International Search Report with Written Opinion issued in PCT/CA2016/050949, dated Aug. 12, 2016, 10 pages, European Patent Office, Rijswijk, Netherlands.

* cited by examiner

ANTI-DRAIN VALVE ASSEMBLY WITH INTEGRATED FIXATION FUNCTION

CROSS-REFERENCE TO RELATED APPLICATION

This application claims priority to and the benefit of U.S. Provisional Patent Application No. 62/205,399 filed Aug. 14, 2015, the contents of which are incorporated herein by reference.

FIELD OF THE INVENTION

The invention relates to an improved valve construction, and more specifically an improved construction for an anti-drain valve to be incorporated into a heat exchanger module such as an engine oil cooler or transmission oil cooler.

BACKGROUND

Plate-type heat exchangers for cooling an oil with a heat exchange fluid are well known. In vehicular applications, such heat exchangers are often mounted on a planar, stamped metal base plate, for example by brazing, to form a heat exchanger module. The heat exchanger module may then be mechanically mounted to a transmission or engine housing, with the base plate providing the module with structural rigidity.

The base plate may include one or more fluid openings providing direct flow communication between one or more fluid manifolds of the heat exchanger and one or more fluid ports of the transmission or engine housing, thereby at least partially eliminating the need for fluid lines and fittings. In a typical structure, the oil outlet port of the transmission or engine housing is in flow communication with the oil inlet manifold of the heat exchanger through an oil inlet opening of the base plate.

A one-way pressure actuated valve may be mounted between the oil outlet port of the transmission or engine housing and the oil inlet manifold of the heat exchanger in order to permit pressurized oil to flow from the engine into the heat exchanger, and to prevent backflow from the oil inlet manifold to the outlet port of the transmission or engine housing. Such anti-drain valves typically have a cylindrical valve housing which is connected directly to the metal base plate of the heat exchanger and project from the bottom surface of the base plate into the oil outlet port of the transmission or engine housing.

Anti-drain valves are required to form a fluid-tight sealed connection with the base plate. In order to achieve a fluid-tight connection with the base plate, it is believed necessary to form the valve housing from a metal which can be sealingly joined to the base plate, for example by brazing or swaging, or by integral formation of the housing and the base plate. Therefore, conventional anti-drain valves typically comprise a housing in the form of a cylindrical aluminum sleeve which is integrally formed with an aluminum base plate or which is brazed or swaged thereto. The internal components of the valve may be supplied as an integral assembly which is then inserted into the housing, for example by press-fitting. Examples of such valves are disclosed in commonly assigned US Publication No. US 2015/0129164 A1 (Ollier), published on May 14, 2015.

While some of the internal components of the valve may be formed from relatively inexpensive materials such as plastics, the need to form the valve housing from metal and to join it to the base plate by brazing, swaging or integral construction are serious limitations which result in higher material costs and additional manufacturing steps, thereby increasing the cost of the heat exchanger module. In addition, the need for a cylindrical metal housing limits opportunities to achieve improvements in construction of the valve, such as the integration of the housing with other valve components, and therefore limits opportunities to achieve cost reductions in the construction of the valve.

Therefore there is a need for an improved construction of heat exchanger modules, and a particular need for anti-drain valves which have a simplified construction and avoid costly manufacturing steps, while providing a fluid-tight sealed connection with the base plate.

SUMMARY

In an embodiment, there is provided an anti-drain valve for a plate cooler having a base plate with an oil opening. The anti-drain valve comprises: (a) a plastic housing having a generally cylindrical outer wall with an inner surface and an outer surface, open first and second ends, and an inner support structure integrally formed with the outer wall and attached to the inner surface thereof; (b) a valve seat proximate to the second end of the housing; (c) a piston located within the support structure and axially movable toward and away from the valve seat; (d) a biasing member located within the support structure and biasing the piston toward the valve seat; and (e) a first resilient sealing element proximate to the first end of the housing, and adapted to provide a seal between the housing and the base plate.

The outer wall of the housing comprises a first portion and an adjacent second portion, the first portion being proximate to the first end of the housing and defining a first axial surface having a first outside diameter which is smaller than an inside diameter of the oil opening of the base plate, and the second portion being distal to the first end of the housing and defining a second axial surface having a second outside diameter which is larger than the inside diameter of the oil opening.

The first portion of the housing further defines a plurality of inwardly bendable detents, each of the detents being defined by a pair of slots through the outer wall and proximate to the first end of the housing; and each of the detents has a tip projecting radially outwardly from the first axial surface.

In an embodiment, the housing further comprises a first radial surface extending outwardly from the first axial surface to the second axial surface; and a plurality of second radial surfaces defined by said detents, wherein the tip of each said detent projects radially outwardly from the first axial surface along one of said second radial surfaces; and wherein the first radial surface is axially spaced from each of the second radial surfaces by a distance which is slightly greater than a thickness of the base plate at an inner peripheral edge of the oil opening, such that a groove for receiving and retaining the inner peripheral edge is defined by the first axial surface, the first radial surface, and the second radial surface of each of said detents.

In an embodiment, the first resilient sealing element is provided in said groove, and the first resilient sealing element may comprise a first annular sealing ring. In an embodiment, the first annular sealing ring is partially housed in a depression in the first radial surface; and the distance between the first radial surface and the second radial surfaces is such that the first annular sealing ring is compressed between the first radial surface and a surface of the base plate adjacent to the inner peripheral edge of the oil opening, when the inner peripheral edge of the oil opening is received in said groove.

In an embodiment, the tip of each of the detents has a chamfered surface which is angled inwardly between the second radial surface and the first end of the housing, such that the first end of the housing has a diameter which is less than the inside diameter of the oil opening.

In an embodiment, the piston has a first surface facing toward the first end of the housing, and a second surface facing toward the second end of the housing; wherein the second surface of the piston is adapted to sealingly engage the valve seat; and wherein the first surface of the piston is adapted to engage the biasing member.

In an embodiment, the biasing member comprises an axially extending coil spring having a first end and a second end, the first end engaging the first surface of the piston, the coil spring being compressible in response to a predetermined fluid pressure applied to the second surface of the piston; wherein the support structure includes an axially extending tubular support member which engages and retains the second end of the coil spring.

In an embodiment, the first surface of the piston is in the form of a hollow cup which is adapted to engage and receive the first end of the coil spring, and wherein the tubular support member is at least partially received inside the second end of the coil spring; and wherein the coil spring is under compression between the piston and the tubular support member, and biases the piston toward a closed position of the valve.

In an embodiment, the support structure further comprises a plurality of piston guide members extending axially within the housing, wherein the piston guide members are in engagement with or in close proximity to the second surface of the piston; wherein the piston guide members are spaced inwardly from the inner surface of the cylindrical outer wall of the housing.

In an embodiment, the tubular support member is attached to the inner surface of the generally cylindrical outer wall through a plurality of radially-extending webs, wherein the webs are separated by spaces.

In an embodiment, the second portion of the housing is generally cup-shaped, having an open top with a radially outwardly extending lip, and a central aperture in its bottom surface defining an oil inlet opening; wherein the first portion of the housing includes a cylindrical ring having a lower portion which is received in the groove, wherein the cylindrical ring has an inner surface partly defining the inner surface of the generally cylindrical outer wall, and an outer surface defining the first axial surface.

In an embodiment, the circumferential groove is located between the lip and a plurality of axially upwardly extending fingers extending above the lip along the inner surface of the cylindrical ring; wherein at least some of the fingers are provided with apertures proximate to their free ends, wherein the apertures are adapted to receive inwardly projecting lugs projecting inwardly from the inner surface of the cylindrical ring, and located between adjacent pairs of said radial webs, wherein the lugs are sized and located so as to be received in the apertures of the fingers, to lock together the first and second portions of the housing; and wherein at least some of the fingers engage and support inner surfaces of the detents.

In an embodiment, the valve seat is formed on a first end surface of a cylindrical ring which also has a second end surface, an inner cylindrical surface and an outer cylindrical surface; wherein the outer cylindrical surface of the cylindrical ring has a diameter which is less than a diameter of the inner surface of the cylindrical outer wall of the housing; and wherein the cylindrical ring is at least partially received and retained within the second end of the housing. In an embodiment, the cylindrical ring forms an interlocking connection with the housing.

In an embodiment, the first end surface of the cylindrical ring is provided with a second resilient sealing element; and wherein the second resilient sealing element is positioned such that it contacts the piston.

In an embodiment, the second resilient sealing element comprises a second annular sealing ring which is partially housed in an annular groove in the first end surface of the cylindrical ring; and wherein the second annular sealing ring is retained between the first end surface of the cylindrical ring and the inner support structure of the housing.

In an embodiment, there is provided a heat exchanger module comprising: (a) an anti-drain valve as described herein; (b) a heat exchanger having a fluid inlet manifold; and (c) a base plate having a top surface and a bottom surface, wherein the top surface is attached to the heat exchanger, and the base plate has a fluid inlet opening in flow communication with the fluid inlet manifold of the heat exchanger; wherein the first resilient sealing element is compressed between the first radial surface and the bottom surface of the base plate, adjacent to an inner peripheral edge of the fluid inlet opening, and is in sealed engagement with the base plate and the first radial surface. In an embodiment, the bottom surface of the base plate is provided with a chamfer immediately adjacent to the fluid inlet opening, the provided with a chamfer extending inwardly from the bottom surface toward the top surface of the base plate, so as to form a conical sealing surface.

BRIEF DESCRIPTION OF THE DRAWINGS

The invention will now be described, by way of example only, with reference to the accompanying drawings in which.

DETAILED DESCRIPTION

Figure 1:
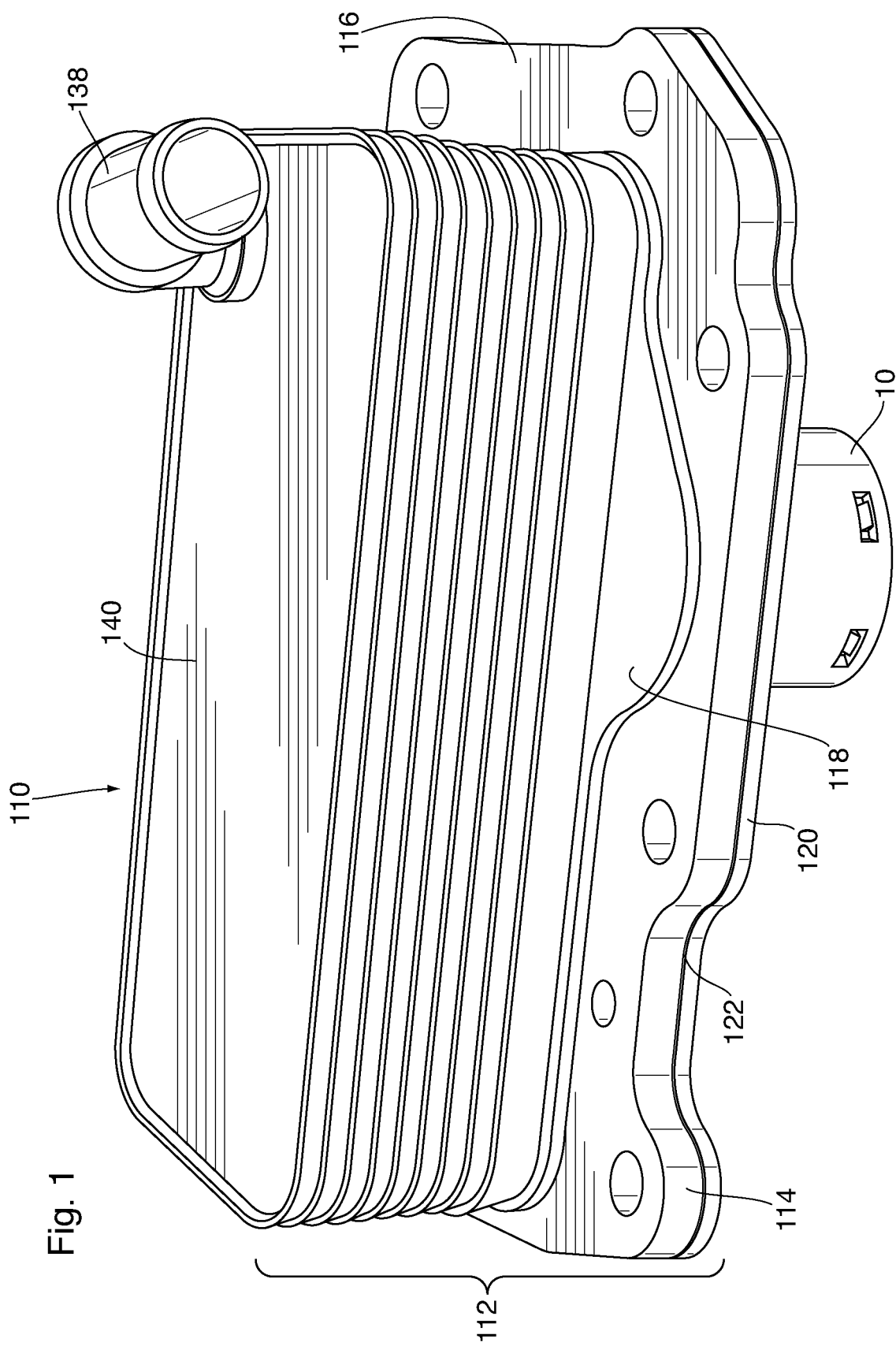
FIG. 1 is a perspective view from the top and side of a heat exchanger module incorporating an anti-drain valve according to the present disclosure.
Figure 2:
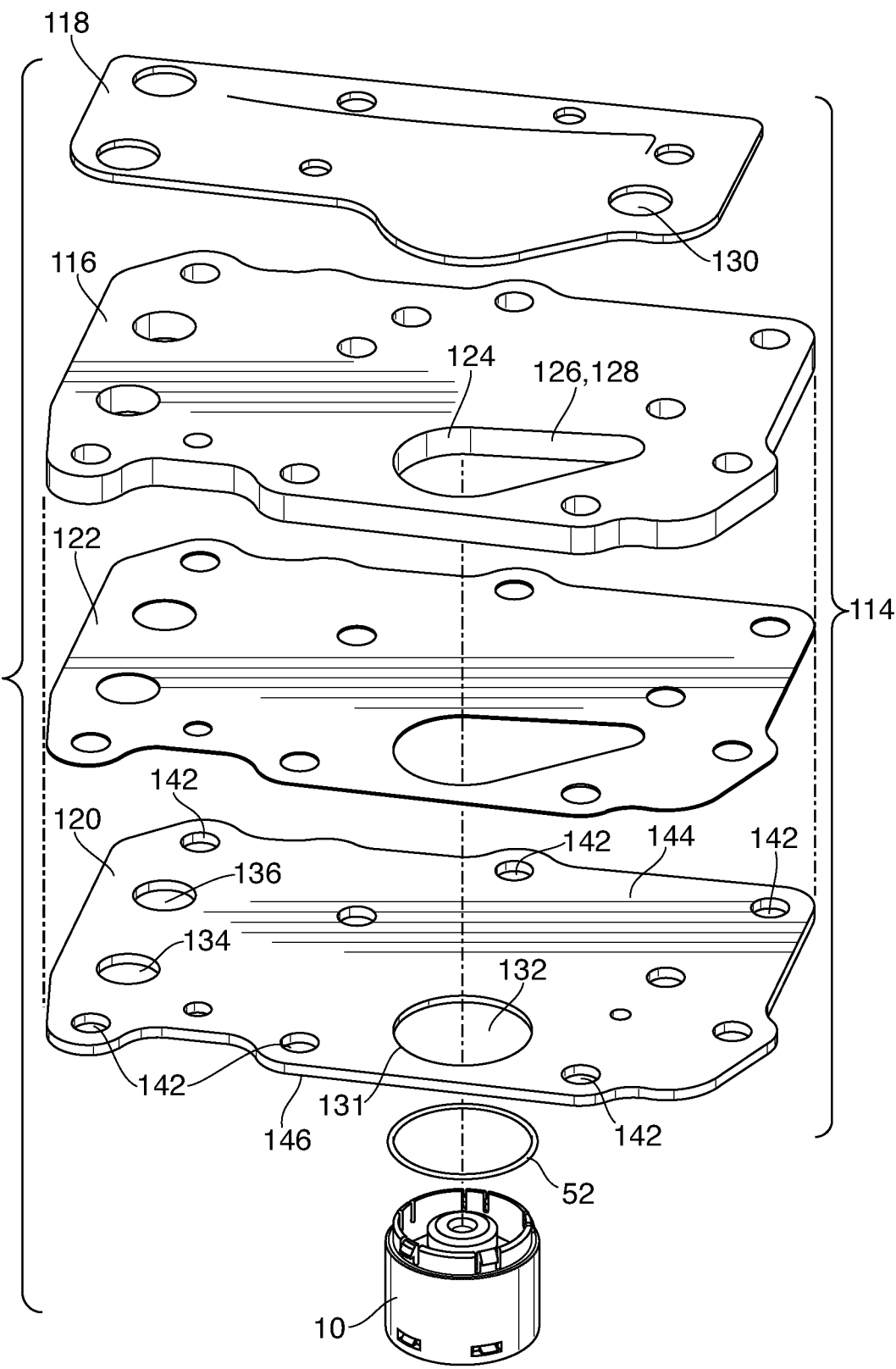
FIG. 2 is an exploded perspective view from the top and side showing the base plate assembly and the anti-drain valve of the heat exchanger module of FIG. 1.

FIGS. 1 and 2 illustrate a heat exchanger module 110 incorporating an anti-drain valve 10 according to the present disclosure.

Heat exchanger module 110 is comprised of a heat exchanger 112 fixedly attached to a base plate assembly 114. In the subject embodiment the heat exchanger module 110 is particularly suited for direct mounting to the exterior of an automobile engine housing or casing (not shown) and, therefore, functions as an engine oil cooler (EOC). However, it will be understood that the heat exchanger module 110 can be adapted for other purposes or applications. For example, the heat exchanger module 110 may instead function as a transmission oil cooler (TOC), in which case the heat exchanger module 110 will be adapted for direct mounting to an exterior of a transmission housing or casing.

In the subject embodiment, the base plate assembly 114 comprises a plurality of layers, and is comprised of a first adapter plate 116 that is brazed directly to the base of the heat exchanger 112 by means of a first shim plate 118. A second adapter plate 120 is brazed directly to the opposite surface of the first adapter plate 116 by means of a second shim plate 122.

Figure 9:
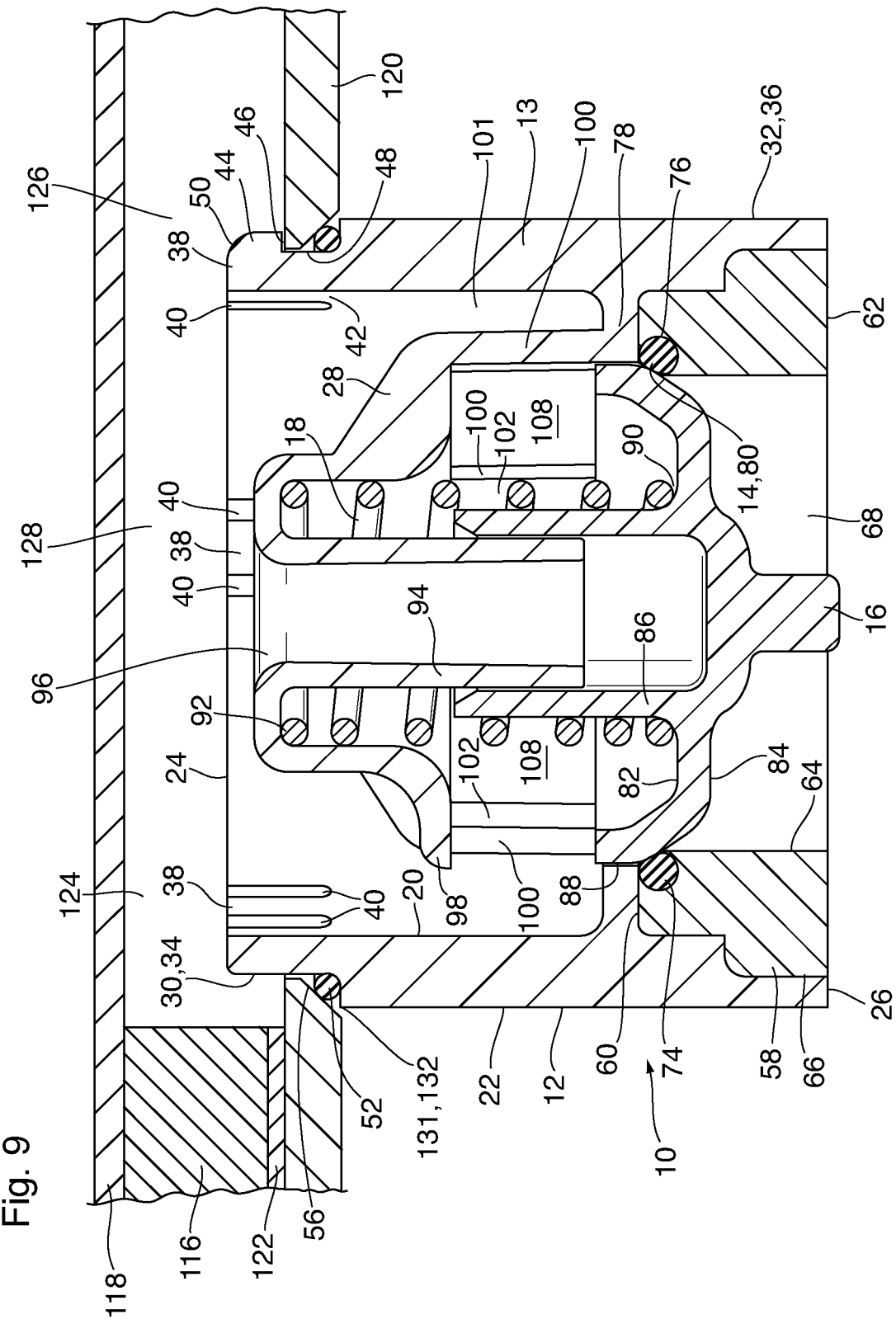
FIG. 9 is a cross-sectional similar to FIG. 6, showing some alternative structural features of the valve and the base plate.

First adapter plate 116 is a relatively thick, machined or formed aluminum plate that offers the required structural rigidity for directly mounting the heat exchanger module 110 to the engine housing, while shim plates 118, 122 are substantially thinner than first adapter plate 116 and are made of braze clad aluminum. The first adapter plate 116 includes trough portion 124 in the form of a cut-out within the first adapter plate 116. The cut-out or trough portion 124 extends into an extension portion 126 of the base plate assembly 114 and, together with the first and second shim plates 118, 122, forms a fluid transfer channel 128 in the base plate assembly 114, one end of the fluid transfer channel 128 communicating with one of the fluid manifolds in heat exchanger 112 (the oil inlet manifold in the present embodiment) via a corresponding fluid opening 130 formed in the first shim plate 118. FIG. 9 also shows how the fluid transfer channel 128 is formed between the plates 118, 122.

The other end of the fluid transfer channel 128 extends into the extension portion 126 of the base plate assembly 114 and is adapted for fluid connection to a corresponding fluid port on the automobile system component housing (the engine oil outlet on the engine housing) through a fluid opening 132 in the second adapter plate 120, comprising an oil inlet opening in the present embodiment, the oil inlet opening 132 having an inner peripheral edge 131. The extension portion 126 therefore provides an indirect fluid connection (i.e. at least partially outside the boundary of or the footprint of the heat exchanger 112) to one of the fluid manifolds within the heat exchanger 112, i.e. the oil inlet manifold in the present embodiment.

Second adapter plate 120 is also provided with two additional fluid openings 134, 136 in fluid communication with separate fluid manifolds in heat exchanger 112. In the specific embodiment illustrated, fluid opening 134 communicates with the oil outlet manifold of heat exchanger 112, via corresponding openings formed in first adapter plate 116 and shim plates 118, 122, these openings being shown in FIG. 2, and is coupled to the corresponding fluid port (i.e. the oil inlet port) on the engine housing. Fluid opening 136 communicates with the coolant inlet manifold of heat exchanger 112 via corresponding openings formed in first adapter plate 116 and shim plates 118, 122, these openings being shown in FIG. 2, and is coupled to a corresponding fluid port (i.e. the coolant inlet port) on the engine housing.

As shown in FIG. 1, heat exchanger 112 further comprises a coolant outlet fitting 138 which is brazed to a top plate 140 of heat exchanger 140, and which communicates with a coolant inlet manifold of heat exchanger 112.

The second adapter plate 120 is also provided with a plurality of bores 142 around the perimeter thereof, each of which align with corresponding openings in the first adapter plate 116, shim plates 118, 122, and in the automobile system component housing (i.e. the engine housing). Each bore 142 is adapted for receiving a fastening device (such as a bolt) for securing the heat exchanger module 110 to the component housing.

While a particular embodiment of the fluid circuiting through heat exchanger module 110 has been described, it will be understood by those skilled in the art that this is not intended to be limiting and that variations to the exact fluid circuits through the heat exchanger module 110 and the number and location of the fluid ports provided on the heat exchanger 112 and/or plates of the base plate assembly 114 will depend on the particular structure of the heat exchanger 112 and the particular application of the heat exchanger module 110. Also, in some embodiments, the base plate structure may not require an offset between a heat exchanger manifold and a corresponding port on the engine housing, in which the base plate structure may be simplified and may not necessarily include adapter plates and/or multiple shim plates. For example, as further discussed below, the base plate may comprise a single layer. In embodiments described herein having a single-layer base plate, the base plate is identified by reference numeral 114.

The second adapter plate 120 has a top surface 144 in contact with the second shim plate 122 and an opposed bottom surface 146 adapted to be secured to a surface of the engine housing. Extending from the bottom surface 146 and forming a sealed, fluid-tight connection with the oil inlet opening 132 is a valve 10, which is a one-way valve actuated by fluid (oil) pressure, permitting pressurized engine oil to flow from the engine oil outlet on the engine housing to the oil inlet manifold of heat exchanger 112, but preventing backflow of oil from the oil inlet manifold of heat exchanger 112 to the engine oil outlet on the engine housing under conditions of lower engine oil pressure. Accordingly, valve 10 is referred to herein as an "anti-drain" valve. The anti-drain valve 10 is adapted to be received inside the engine oil outlet on the engine housing.

The construction of an anti-drain valve 10 according to a first embodiment is now described below with reference to FIGS. 3 to 10.

Figure 4:
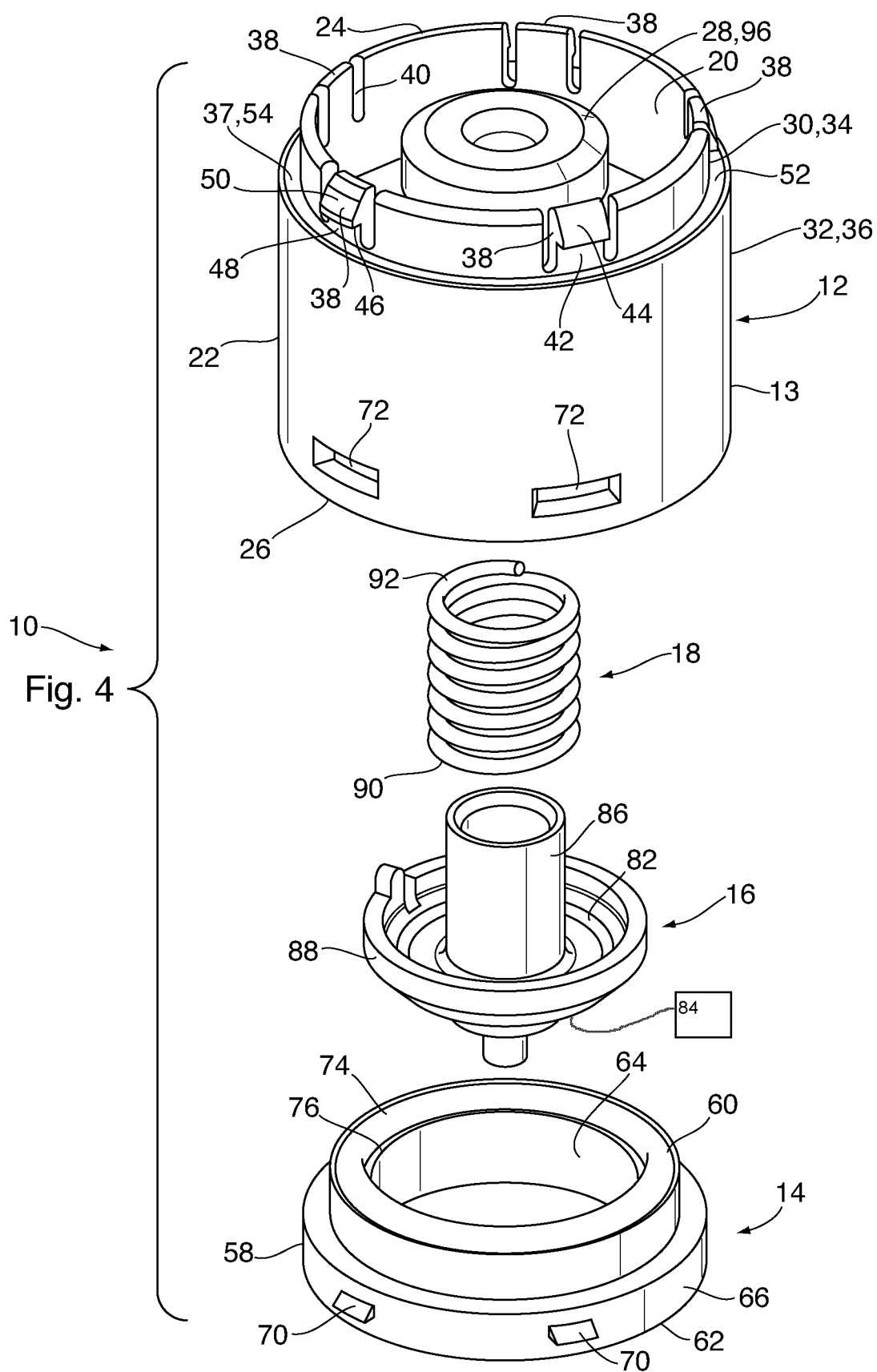
FIG. 4 is an exploded perspective view of the components of an anti-drain valve according to a first embodiment.

As shown in FIG. 4, anti-drain valve 10 comprises four components: a housing 12, a valve seat 14, a piston 16 and a biasing member 18. To minimize material costs, all components except the biasing member 18 are made from plastic.

The housing 12 comprises a cylindrical outer wall 13 with an inner surface 20 and an outer surface 22. The housing 12 has a central longitudinal axis A and has a first end 24 and a second end 26 which are spaced apart along the axis A. The first and second ends 24, 26 are both open.

In addition to defining axial directions along axis A, the housing 12 also defines radial directions with reference to axis A. Therefore, terms such as "inside", "outside", "inner", "outer", "inward", "outward" and like terms refer to radial directions and/or positions of elements in relation to axis A. The length of any element described herein is defined along axis A, and the width and/or thickness of any element described herein, unless otherwise indicated, are defined in a radial direction, transverse to axis A.

Figure 7:
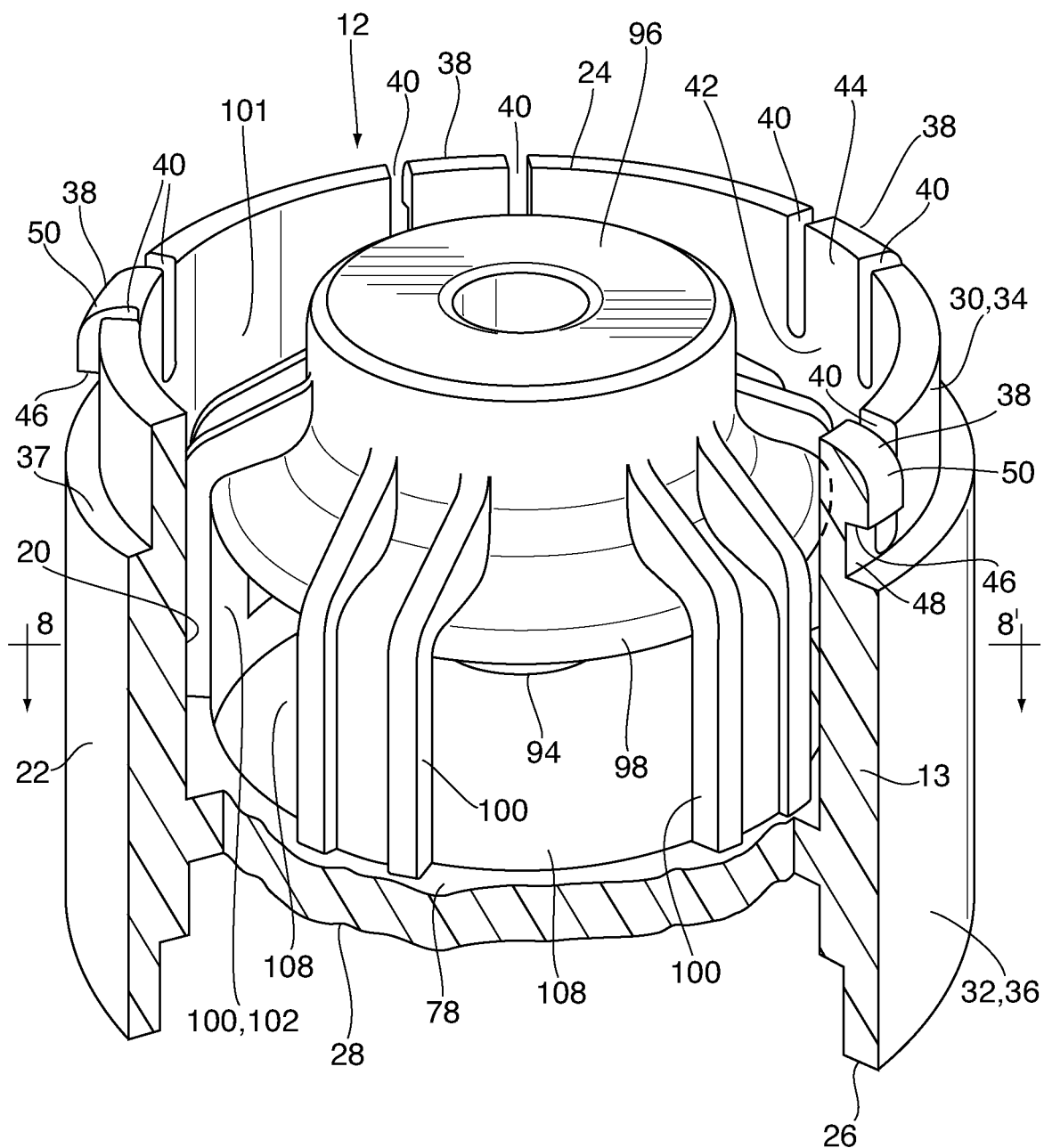
FIG. 7 is an isolated perspective view of the housing of the anti-drain valve of FIG. 4, from the first end and the side thereof, partly sectioned and cut away to reveal the support structure.
Figure 8:
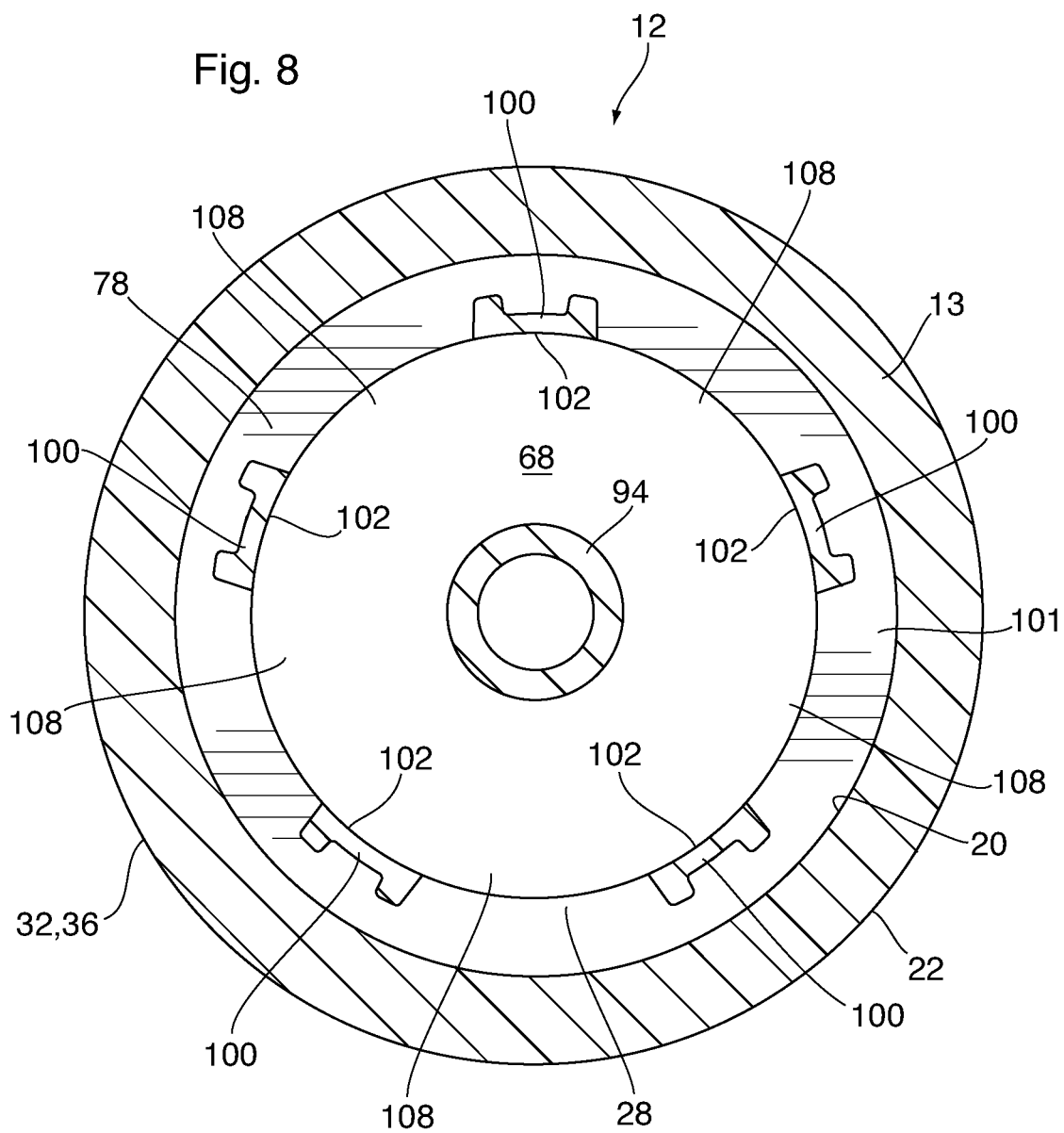
FIG. 8 is a cross-sectional plan view of the housing, taken along line 8-8' of FIG. 7.

An inner support structure, generally identified by reference numeral 28 and discussed in greater detail below with reference to FIGS. 7 and 8, is integrally formed with the outer wall 13 and attached to the inner surface 20 thereof. It will be appreciated that the outer cylindrical wall 13 and support structure 28 can easily be integrated where the housing 12 is formed from plastic, for example by injection molding, whereas the formation of this integrated structure from a metal such as aluminum would be impractical. It will also be appreciated that the integration of the support structure 28 and the outer cylindrical wall 13 reduces the number of components of the valve, thereby reducing material and/or manufacturing costs.

The outer wall 13 of housing 12 varies in diameter along its outer surface 22. For example, as shown in the drawings, the outer wall 13 comprises a first portion 30 and an adjacent second portion 32. In the present embodiment, the first portion 30 is of smaller diameter than the second portion 32. The first portion 30 is proximate to the first end 24 of the housing and defines a first axial surface 34 having a first outside diameter which is smaller than an inside diameter of the oil inlet opening 132, the first outside diameter being only slightly smaller than the inside diameter of the oil inlet opening 132 such that the first portion 30 of outer wall 13 is adapted to be closely received within the oil inlet opening 132.

The second portion 32 of outer wall 13 is distal to the first end 24 of housing 12 and defines a second axial surface 36 having a second outside diameter which is larger than the first outside diameter and larger than the inside diameter of the oil inlet opening 132, such that the second portion 32 of outer wall 13 is too large to fit within the oil inlet opening 132. In the present embodiment, the second portion 32 of outer wall 13 extends from the first portion 32 to the second end 26 of housing 12, with the second axial surface 36 being of constant diameter and also extending to the second end 26 of housing 12. However, it will be appreciated that this arrangement is not essential, and that the second portion 32 need not extend to the second end 26 of housing 12.

In the present embodiment, the outer wall 13 further comprises a first radial surface 37 extending outwardly from the first axial surface 34 to the second axial surface 36. The first radial surface 37 is shown as being a planar surface oriented at an angle of about 90 degrees to both the first axial surface 34 and the second axial surface 36. However, as further discussed below, this is not necessarily the case in all embodiments.

The first portion 30 of outer wall 13 further comprises a plurality of inwardly bendable, resilient detents 38, each of which is defined between a pair of closely spaced slots 40 through the outer wall 13 proximate to the first end 24 of housing 12. In the illustrated embodiment, the slots 40 extend axially, and extend throughout substantially the entire length of the first portion 30. The illustrated anti-drain valve 10 includes five detents 38, however, it will be appreciated that the number of detents 38 may be more or less than that which is shown in the drawings.

Each detent 38 has a base 42 distal from the first end 24 of housing 12, in which the thickness of the detent 38 is the same as the thickness of the first portion 30 of outer wall 13 between the detents 38. The outer surface of each base 42 forms part of the first axial surface 34.

Each detent 38 also has a tip 44 which is located proximate to the first end 24 of housing 12, the tip 44 having a maximum thickness which is greater than the thickness of the base 42. The tip 44 projects outwardly from the base 42 and from the first axial surface 34. The thickness of the tip 44 is such that the tips 44 of the detents 38, in the unbent state, will extend outwardly of the inner diameter of the oil inlet opening 132.

The first portion 30 of outer wall 13 further includes a plurality of second radial surfaces 46, each of which is defined as a surface along which the tip 44 of detent 38 projects radially outwardly from the base 42 (i.e. the first axial surface 34). Each of the second radial surfaces 46 is shown as being a planar surface oriented at an angle of about 90 degrees to both the first axial surface 34 and the second axial surface 36, and parallel to the first radial surface 37. However, as further discussed below, this is not necessarily the case in all embodiments. For example, the second radial surfaces 46 may be angled longitudinally toward the first end 24 of housing 12.

Figure 5:
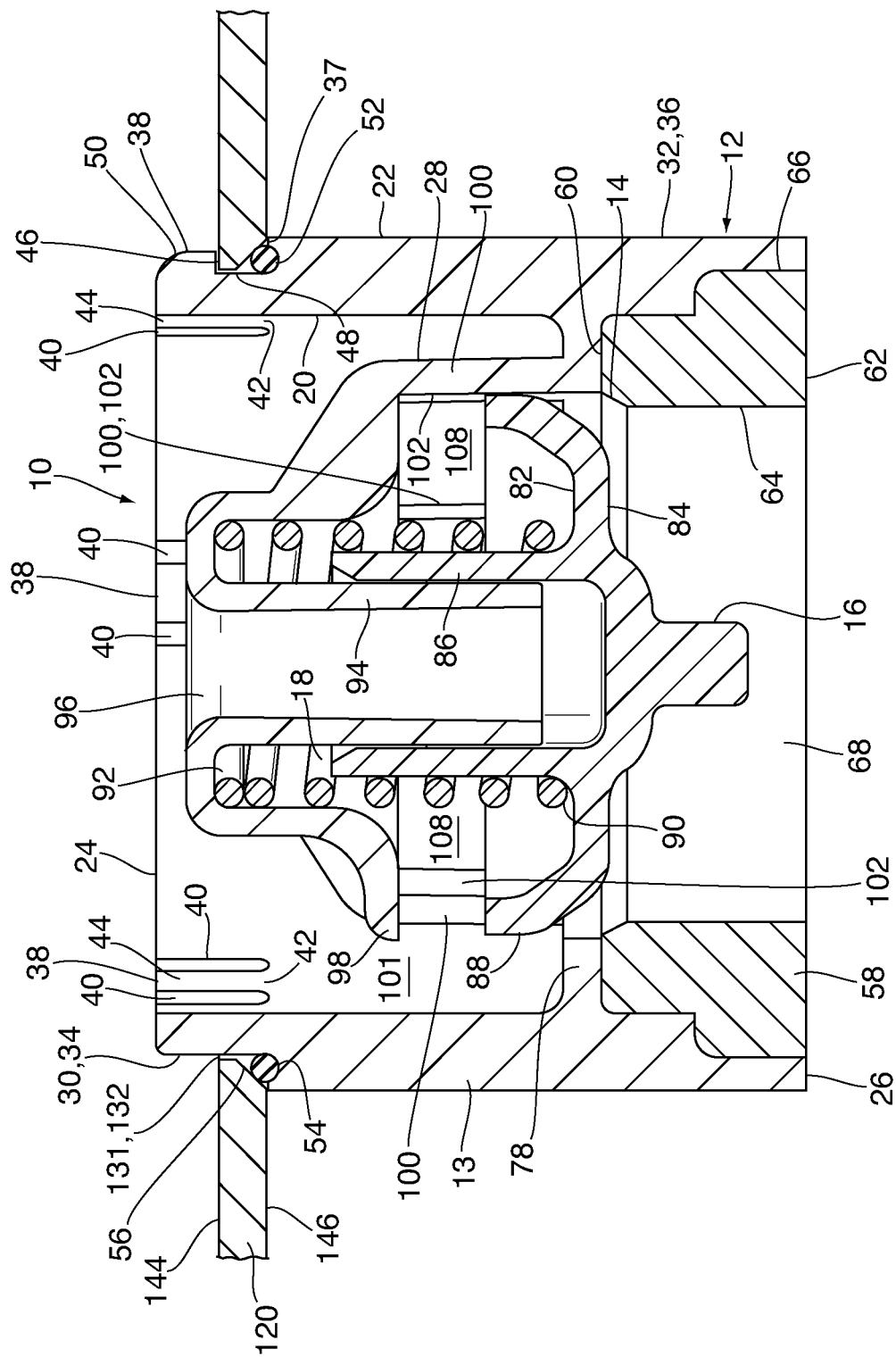
FIG. 5 is a cross-sectional elevation view through the anti-drain valve of FIG. 4 and the base plate, with the valve open.
Figure 6:
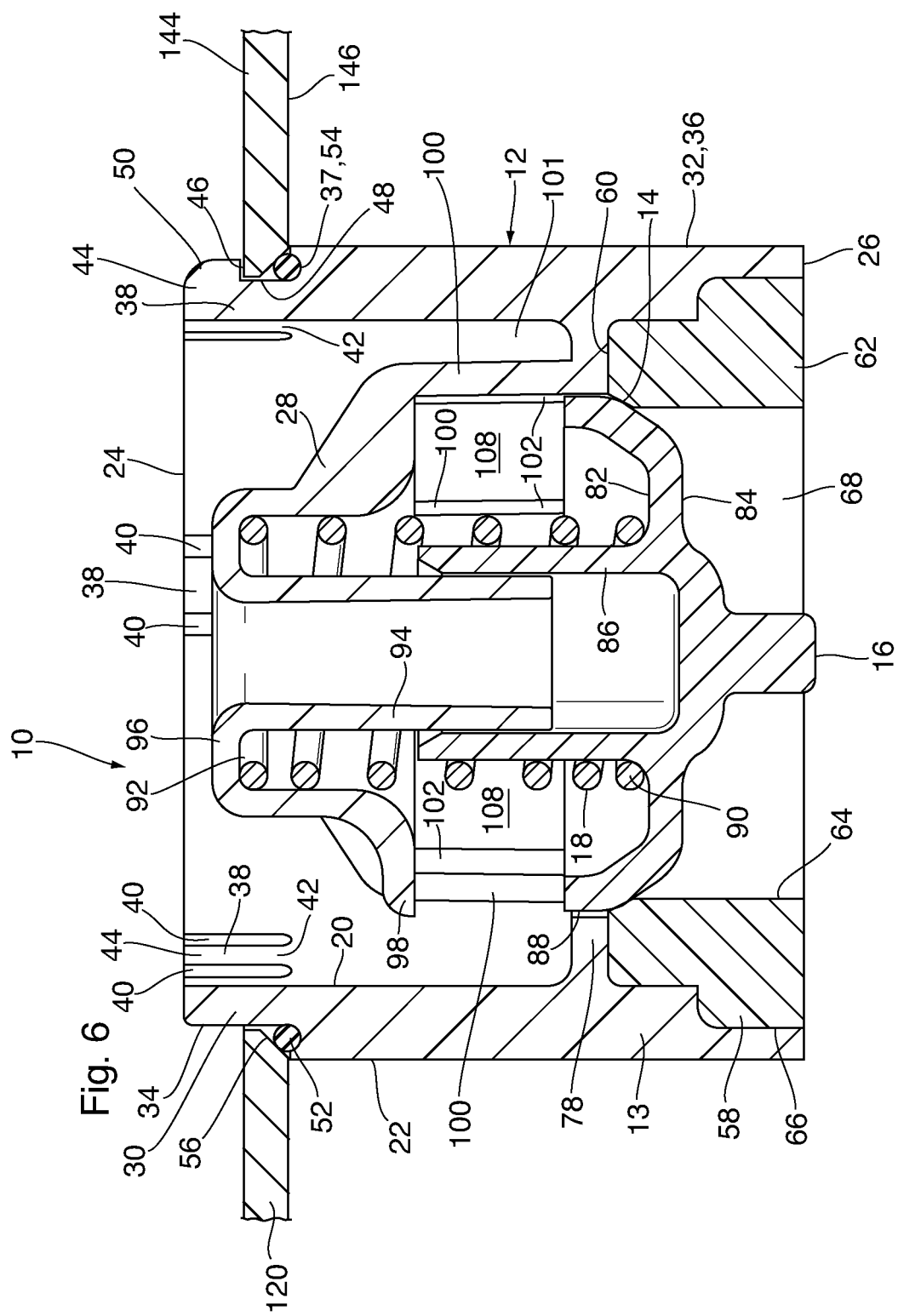
FIG. 6 is a cross-sectional elevation view through the anti-drain valve of FIG. 4 and the base plate, with the valve closed.

The first and second radial surfaces 37, 46 are spaced from each other by an axial distance which is slightly greater than a thickness of the inner peripheral edge 131 of the oil inlet opening 132 which, in the present embodiment, corresponds to the thickness of the second adapter plate 120. As a result, each of the detents 38 defines a groove 48 which is sized and shaped to receive and retain the inner peripheral edge 131 of the oil inlet opening 132, the groove 48 being defined by the first axial surface 34 in base 42, the first radial surface 37 and the second radial surface 46. FIGS. 5 and 6 show the inner peripheral edge 131 of the oil inlet opening 132 received and retained within the groove 48.

The base 42 of each detent 38 is inwardly bendable by an extent such that the tips 44 of the detents 38 can be pushed inwardly by the application of moderate pressure, substantially flush with the first axial surface 34. This permits the detents 38 to bend inwardly when the first end 24 of housing 12 is inserted into the oil inlet opening 132 by exerting axial pressure on the housing 12. Furthermore, the resilience of the detents 38 permits them to spring back to the unbent, relaxed position once the tips 44 of the detents 38 pass through the opening 132. Thus, the first portion 30 of the outer wall 13 forms an interference fit or snap fit with the oil inlet opening 132, and resists withdrawal of the valve 10 from the opening 132 of second adapter plate 120.

It will be appreciated that the formation of detents 38 at the first end 24 of the valve 10 is simpler where the housing 12 is formed from plastic, and would be more difficult and costly where the housing 12 is formed from metal. Furthermore, the resilience of plastic detents 38 is expected to be better than that of detents of comparable (radial) thickness formed in a metal housing.

To ease insertion of the first portion 30 through opening 132, the tip 44 of each detent 38 may have a chamfered surface 50 which is angled inwardly between the second radial surface 46 and the first end 24 of the housing 12. As a result, the first end 24 of the housing 12 has a diameter which is less than the inside diameter of the oil inlet opening 132, permitting it to be inserted into the opening 132.

Figure 3:
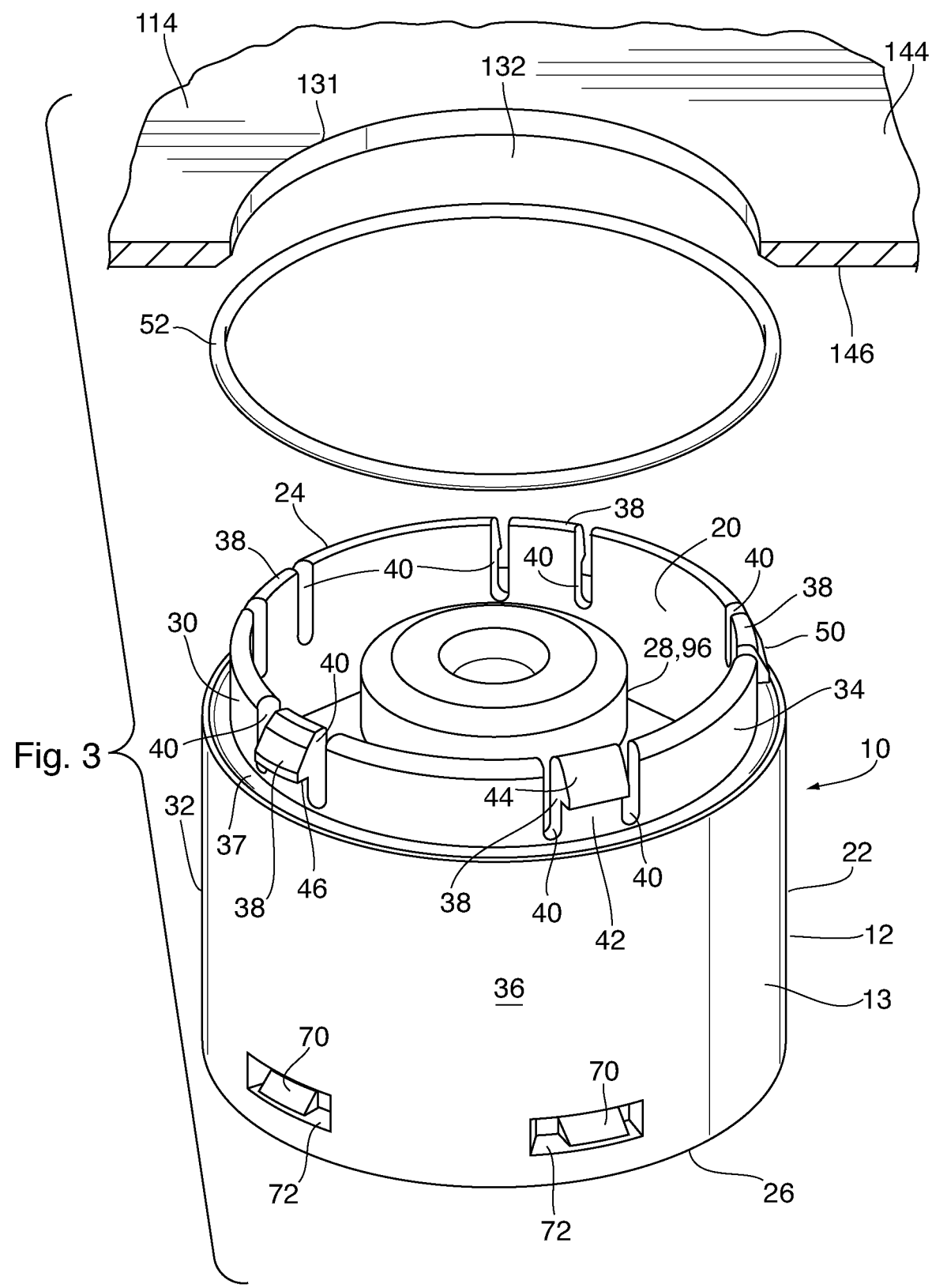
FIG. 3 is a perspective view, partly in cross-section, showing an oil opening of the base plate and the anti-drain valve of FIG. 1.

The anti-drain valve 10 also may also include means for providing a fluid-tight seal between the valve housing 12 and the second adapter plate 120. In this regard, the valve 10 further comprises a first resilient sealing element which, as shown in FIG. 3, comprises a first annular sealing ring 52 such as an O-ring having an inside diameter slightly greater than the diameter of the first axial surface 34, and an outside diameter less than the diameter of the second axial surface 36.

The first sealing ring 52 may simply be retained within the grooves 48 provided by detents 38. Alternatively, the first sealing ring 52 may be partly housed in a depression 54 provided in the first axial surface 34 and/or in the first radial surface 37. The dimensions of the first sealing ring 52 are such that it will be compressed between the first radial surface 37 and/or the first axial surface 34, and a surface of the second adapter plate 120 at or adjacent to the inner peripheral edge 131 of the oil inlet opening 132 (e.g. bottom surface 146 in FIG. 2), when the inner peripheral edge 131 of the oil inlet opening 132 is received in the grooves 48 defined by detents 38. The compression of the first sealing ring 52 brings it into intimate sealing contact with both the housing 12 and the second adapter plate 120, thereby providing a fluid-tight seal between the second adapter plate 120 and the housing 12 of valve 10.

To assist in providing a fluid-tight seal, the surface of second adapter plate 120 which is engaged by the first sealing ring 52, for example bottom surface 146 thereof, may be shaped so as to improve sealing contact with the first sealing ring 52. For example, as shown in the drawings, the bottom surface 146 of the second adapter plate 120 immediately adjacent to the oil inlet opening 132 may be provided with a chamfer 56 extending inwardly from the bottom surface 146 toward the top surface 144. This chamfer 56 provides a conical sealing surface which helps to seal against and retain the position of the first sealing ring 52. Thus, it can be seen from the above description that the valve construction described herein permits the formation of an effective fluid-tight seal between the valve housing 12 and the base plate 114, while avoiding the above-mentioned disadvantages of known anti-drain valves with metal housings.

The valve seat 14 is located proximate to the second end 26 of housing 12. In the illustrated embodiment, the valve seat 14 is formed on a first end surface 60 of a cylindrical ring 58, wherein the first end surface 60 faces away from the second end 26 in the assembled valve 10. The ring 58 also has an opposed second end surface 62, an inner cylindrical surface 64 and an outer cylindrical surface 66. The inner cylindrical surface 64 defines an inlet opening 68 through which the valve 10 receives oil from the oil outlet port of the transmission or engine housing. The ring 58 may be formed from plastic, for example by molding.

The outer cylindrical surface 66 of the cylindrical ring 58 has a diameter which is less than a diameter of the inner surface 20 of housing 12, such that it is at least partially received and retained within the second end 26 of housing 12. In the present embodiment, the cylindrical ring 58 is closely received within the second end 26 of housing 12, and with the ring 58 forming an interlocking connection with the housing 12. For example, in the present embodiment, the outer surface 66 of cylindrical ring 58 is provided with outwardly-extending wedge-shaped protrusions 70 which are adapted to be received and retained in circumferentially-extending slots 72 extending at least partially through the second portion 32 of outer wall 13, from the inner surface 20 thereof. In the illustrated example, the slots 72 extend completely through the outer wall 13 so as to provide a visual indication whether or not the cylindrical ring 58 has been properly inserted into housing 12. The resilience of the plastic ring 58 and the plastic housing 12 allow sufficient deformation to permit insertion of the ring 58 into the second end 26 of housing 12.

The piston 16 has a first surface 82 facing toward the first end 24 of housing 12, and a second surface 84 facing toward the second end 26 of housing 12. The second surface 84 is adapted to sealingly engage the valve seat 14, and the first surface 82 is adapted to engage the biasing member 18.

In the illustrated embodiment, the piston 16 has a mushroom shape, with the first surface 82 being provided with an axially-extending hollow valve stem 86, and the piston 16 has an outer peripheral surface 88 adjoining the first and second surfaces 82, 84, the outer peripheral surface 88 being closely received inside the annular wall 78 of the support structure 28.

As shown in FIGS. 2-6, the biasing member 18 may comprise an axially-extending coil spring having a first end 90 and a second end 92, the first end 90 engaging the first surface 82 of the piston 16, the biasing member 18 biasing the piston 16 toward the closed position of FIG. 6, and being axially compressible in response to a predetermined fluid pressure applied to the second surface 84 of piston 16 so as to cause the valve 10 to open to the position shown in FIG. 5.

The biasing member 18 is supported by an axially-extending tubular support member 94, wherein the tubular support member 94 is surrounded by the biasing member 18, and is slidably received within the hollow stem 86 of the piston 16. The tubular support member 94, which forms part of support structure 28, is centrally located within the housing 12, and extends axially from the centre of a cup-shaped spring support 96, wherein the second end of the biasing member 18 is received within the cup-shaped support 96. The tubular support member 94 and cup-shaped support 96 are both integrally formed with, and attached to the inner surface 20 of housing 12, and are therefore stationary. Therefore, exertion of the predetermined amount of fluid pressure on the second surface 84 of piston 16 results in compression of biasing member 18, and axial movement of the piston 16 away from the valve seat 14, toward the open position shown in FIG. 5.

The cup-shaped spring support 96 has an outer peripheral edge 98 which is spaced from the inner surface 20 of the housing 12 and which is joined thereto by a plurality of axially extending ribs 100, which are spaced about the circumference of the peripheral edge 98 of spring support 96. In particular, as shown in FIGS. 7 and 8, each of the ribs 100 has one end connected to the annular wall 78 and an opposite end joined to the outer peripheral edge 98 of the cup-shaped spring support 96, thereby supporting the spring support 96 and the tubular support member 94. As best seen in FIG. 8, the annular space between the ribs 100 and the inner surface 20 of housing 12 defines the outlet opening 101 of the valve 10. In the illustrated embodiment there are five ribs 100, however, it will be appreciated that the number of ribs 100 may be greater or less than that which is shown herein.

The support structure 28 further comprises a plurality of axially-extending piston guide surfaces 102 extending axially between the annular wall 78 and the outer edge 98 of cup-shaped spring support 96, the guide surfaces 102 being in engagement with or in close proximity to the outer peripheral surface 88 of the piston 16. These surfaces 102 guide and support the piston 16 as it moves axially toward and away from the valve seat 14.

The guide surfaces 102 are integrally formed with the housing 12 and spaced inwardly from the inner surface 20 thereof. The guide surfaces 102 may be attached to the inner surface 20 of housing 12 by the ribs 100 and, in the illustrated embodiment, the guide surfaces 102 comprise the inner surfaces of the ribs 100.

The ribs 100 are spaced apart from one another along the circumference of the annular wall 78. Adjacent ribs 100 are separated by apertures 108, best seen in FIG. 7, which are in flow communication with the first end 24 of housing 12. With the valve 10 open as shown in FIG. 5, these apertures 108 are also in flow communication with the second end 26 of housing 12, thereby permitting flow of oil from the second end 26 to the first end 24 of housing 12. With the valve 10 closed as shown in FIG. 6, the piston 16 blocks flow between the second end 26 of housing 12 and the apertures 108, thereby preventing flow of oil from the second end 26 to the first end 24 of housing 12.

Figure 10:
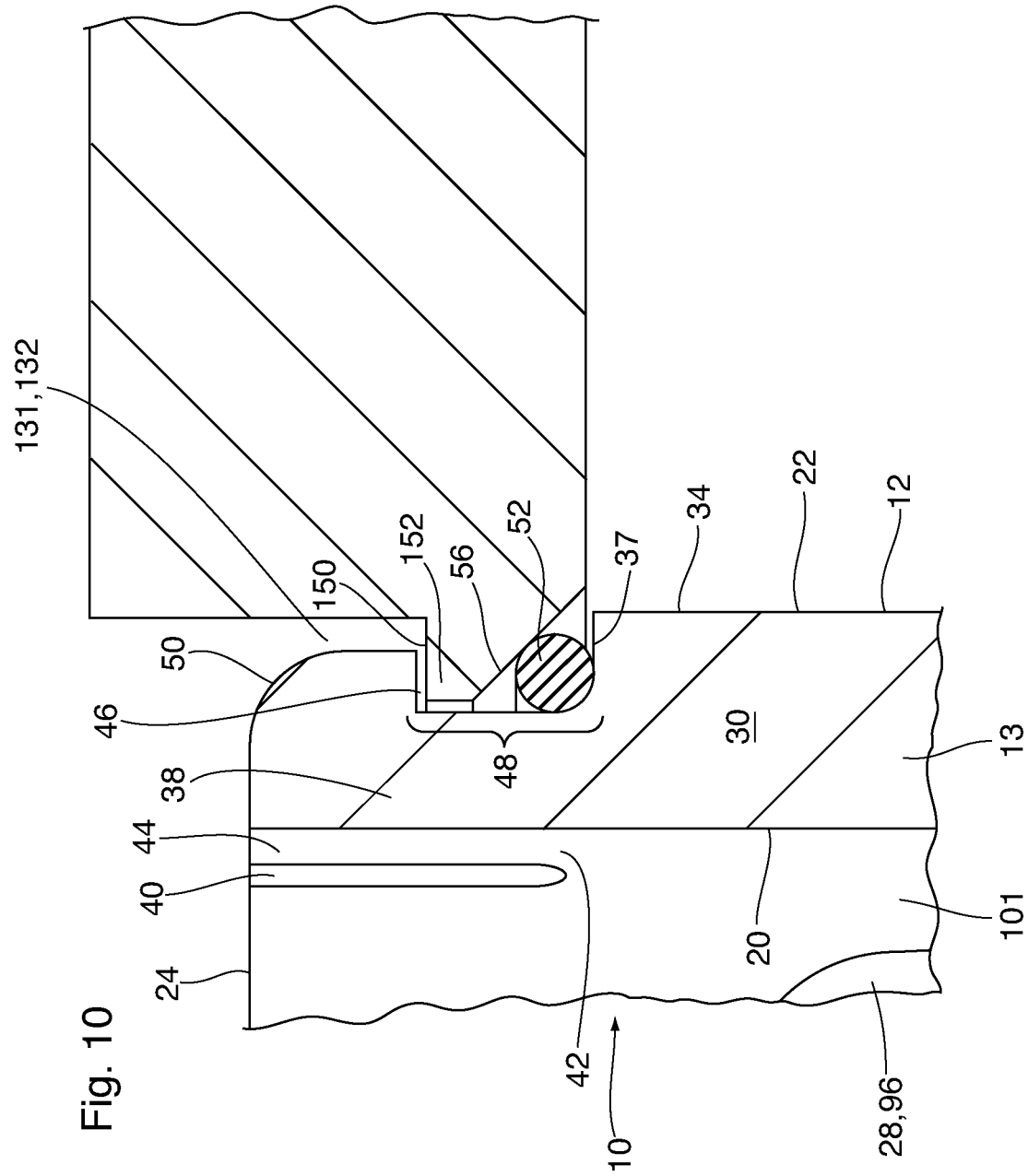
FIG. 10 is a close-up sectional view showing a portion of an anti-drain valve in the oil inlet opening of a relatively thick, single layer base plate.

Some additional and/or alternative features of the anti-drain valve and heat exchanger module are now described below with reference to FIGS. 9-10. The embodiments described below share a number of common features with the anti-drain valve 10 and heat exchanger module 110 described above. Therefore, unless otherwise indicated, the above description of these features applies equally to the following embodiments, and these like features are identified by like reference numerals in the drawings and in the following description.

As shown in FIG. 9, the first end 60 of cylindrical ring 58 may be provided with a second resilient sealing element, such as a second annular sealing ring 74, which is positioned such that it contacts the piston 16 with the valve 10 in the closed position. Thus, where a second annular sealing ring 74 is provided, it forms an annular sealing surface of the valve seat 14.

The second annular sealing ring 74 may be partially housed in an annular depression or groove 76 in the first end surface 60 of the cylindrical ring 58. In the assembled valve 10, the second annular sealing ring 74 is retained between the first end surface 60 of the cylindrical ring 58 and the inner support structure 28 of the housing 12. In the present embodiment, the inner support structure 28 includes an annular wall 78 integrally formed with the housing 12 and projecting inwardly from the inner surface 20 thereof. The groove 76 and annular wall 68 together form a cavity for housing the second sealing ring 74, the cavity having an inwardly-facing opening 80 through which the second sealing ring 74 contacts piston 16. Therefore, where a second sealing ring 74 is provided, it forms the sealing surface of valve seat 14.

FIG. 9 further shows how the anti-drain valve 10 is integrated into the multi-layer base plate assembly 114 shown in FIGS. 1 and 2, and showing the fluid transfer channel 128 between the plates 118, 122.

While the embodiments described above relate to a valve 10 which is adapted to be sealingly connected to the inner peripheral edge 131 of an oil inlet opening 132 of a second adapter plate 120 in a base plate assembly 114, it will be appreciated that the valve 10 can be adapted to other base plate configurations. In this regard, the valve 10 may be sealingly connected to a single-layer base plate 114 in which the thickness of the inner peripheral edge 131 of the oil inlet opening 132 is the same as the thickness of the base plate 114, or embodiments in which the thickness of the inner peripheral edge 131 of the oil inlet opening 132 is less than the thickness of the base plate 114.

For example, in embodiments where the thickness of the inner peripheral edge of the oil inlet opening 132 is the same as the thickness of the base plate 114, the base plate 114 may have substantially the same thickness as the second adapter plate 120 in the embodiments described above.

In embodiments where the thickness of the inner peripheral edge of the oil inlet opening 132 is less than the thickness of the base plate 114, the inner peripheral edge 131 of the oil inlet opening 132 may be provided with a counterbore such that the inner peripheral edge of the oil inlet opening 132 is reduced in thickness relative to the thickness of the base plate 114, and defines an inwardly projecting edge portion 152 having a radial surface 150 which engages the second radial surfaces 46 of the valve housing 12, such that the edge portion is received within the groove 48. This structure is illustrated in FIG. 10.

The construction of an anti-drain valve 200 according to a second embodiment is now described below with reference to the drawings, wherein similar reference numerals, increased by 200, are used to denote similar features. The anti-drain valve 200 is described herein as being adapted to be received in the oil inlet opening 132 of an adapter plate 120 of a heat exchanger module 110 as described above.

Figure 11:
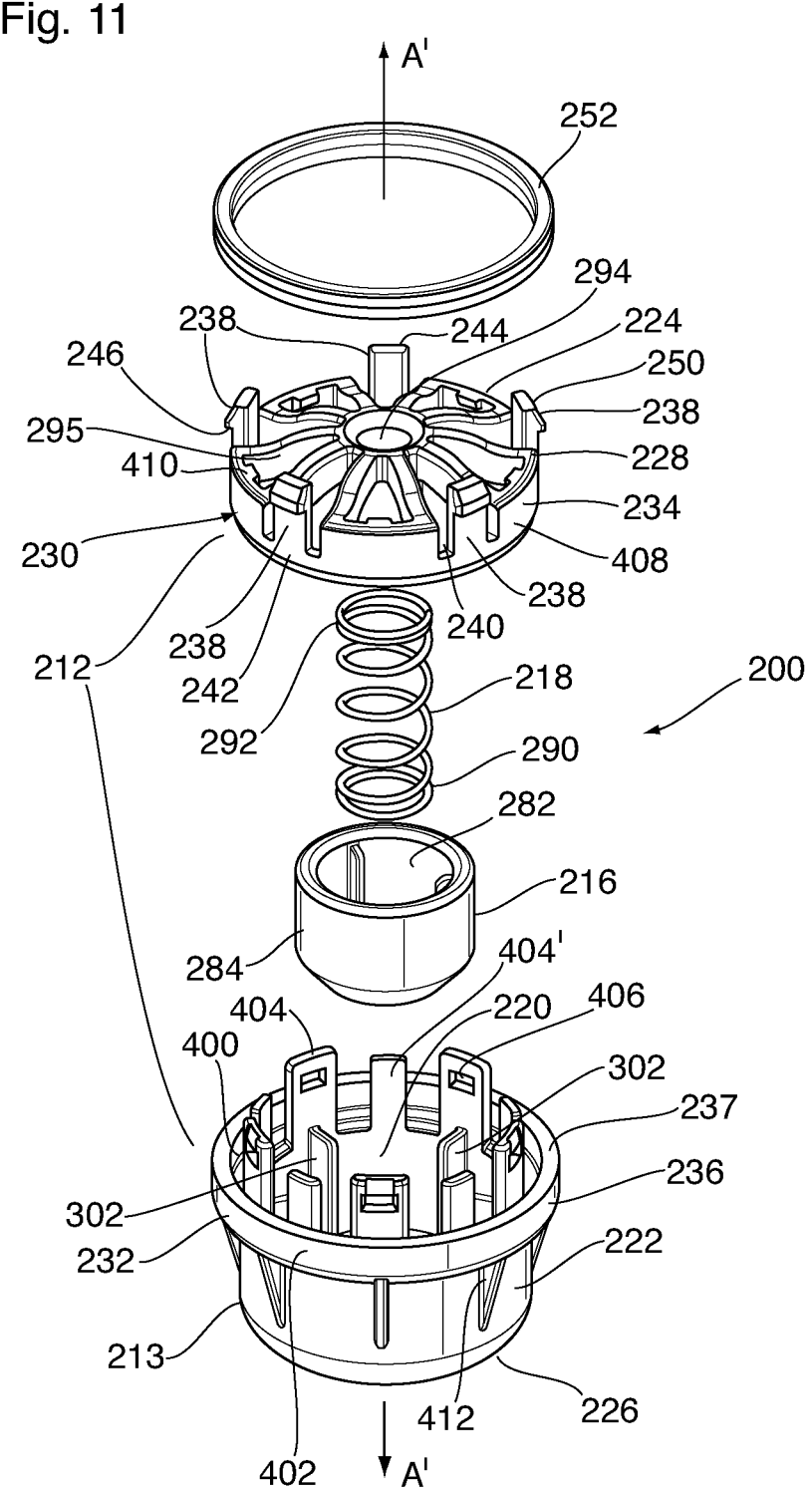
FIG. 11 is an exploded perspective view of the components of an anti-drain valve according to a second embodiment.
Figure 12:
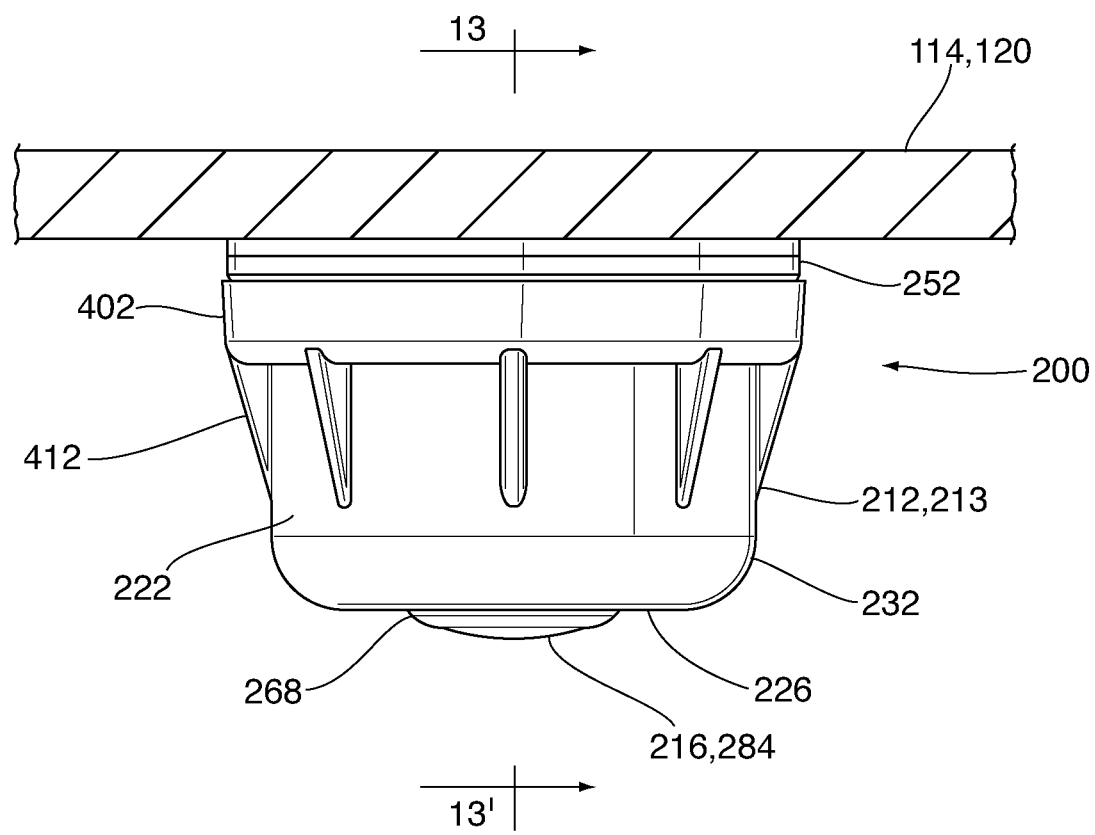
FIG. 12 is a side elevation view showing the anti-drain valve of FIG. 11 installed in a base plate.

As shown in FIG. 11, anti-drain valve 200 comprises a housing 212 having a generally cylindrical outer wall 213, the housing 212 comprising a first portion 230 and a second portion 232. To minimize material costs, the housing 212 is made from plastic.

The outer wall 213 has an inner surface 220 and an outer surface 222. The housing 212 has a central longitudinal axis A' and has a first open end 224 and a second open end 226 which are spaced apart along the axis A'.

In addition to defining axial directions along axis A', the housing 212 also defines radial directions with reference to axis A'. Therefore, terms such as "inside", "outside", "inner", "outer", "inward", "outward" and like terms refer to radial directions and/or positions of elements in relation to axis A. The length of any element described in connection with the present embodiment is defined along axis A', and the width and/or thickness of any element described herein, unless otherwise indicated, are defined in a radial direction, transverse to axis A'.

An inner support structure, generally identified by reference numeral 228 and discussed in greater detail below, is integrally formed with the outer wall 213. It will be appreciated that the outer cylindrical wall 213 and support structure 228 can easily be integrated where the housing 212 is formed from plastic, for example by injection molding, whereas the formation of this integrated structure from a metal such as aluminum would be impractical. It will also be appreciated that the integration of the support structure 228 and the outer cylindrical wall 213 reduces the number of components of the valve 200, thereby reducing material and/or manufacturing costs.

The housing 212 comprises a first portion 230 and an adjacent second portion 232. The first portion 230 is proximate to the first end 224 of the housing and defines a first axial surface 234 having a first outside diameter which is smaller than an inside diameter of the oil inlet opening 132, the first outside diameter being only slightly smaller than the inside diameter of the oil inlet opening 132 such that the first portion 230 of housing 212 is adapted to be closely received within the oil inlet opening 132.

The second portion 232 of housing 212 is distal to the first end 224 of housing 212 and defines a second axial surface 236 having a second outside diameter which is larger than the first outside diameter and larger than the inside diameter of the oil inlet opening 132, such that the second portion 232 of housing 212 is too large to fit within the oil inlet opening 132. In the present embodiment, the second portion 232 of housing 212 extends from to the second end 226 of housing 212, with the second axial surface 236 decreasing in diameter toward the second end 226 of housing 212. The second portion 232 of housing 212 is generally cup-shaped, having an open top with a radially outwardly extending lip 402, a central aperture in its bottom surface defining an oil inlet opening 268, and axially extending support ribs 412 along outer surface 222 to provide support for lip 402.

In the present embodiment, the second portion 232 of housing 212 further comprises a first radial surface 237 partly defining the lip 402 at the open top of the second portion 232. In the assembled housing 212, the first radial surface 237 extends outwardly from the first axial surface 234 to the second axial surface 236. The first radial surface 237 is shown as being a planar surface oriented at an angle of about 90 degrees to both the first axial surface 234 and the second axial surface 236, but this is not essential.

The first portion 230 of housing 212 further comprises a plurality of inwardly bendable, resilient detents 238, each of which is defined between a pair of closely spaced slots 240 through the outer wall 213 proximate to the first end 224 of housing 212. In the illustrated embodiment, the slots 240 extend axially. The illustrated anti-drain valve 200 includes five such detents 238, however, it will be appreciated that the number of detents 238 may be more or less than that which is shown in the drawings.

Each detent 238 has a base 242 distal from the first end 224 of housing 212, in which the thickness of the detent 238 is the same as the thickness of the first portion 230 of outer wall 213 between the detents 238. The outer surface of each base 242 forms part of the first axial surface 234.

Each detent 238 also has a tip 244 or free end which is located at the first end 224 of housing 212, the tip 244 having a maximum thickness which is greater than the thickness of the base 242. The thickness of the tips 244 is such that, with the detents 238 in the unbent state, tips 244 project radially outwardly relative to the base 242 and the first axial surface 234, and relative to the inner diameter of the oil inlet opening 132.

The housing further comprises a plurality of second radial surfaces 246 which are defined by detents 238, each of the second radial surfaces 246 comprising a surface along which the tip 244 of a detent 238 projects radially outwardly from the base 242 (i.e. the first axial surface 234). Each of the second radial surfaces 246 is shown as being a planar surface oriented at an angle of about 90 degrees to both the first axial surface 234 and the second axial surface 236, and parallel to the first radial surface 237. However, this is not essential. For example, the second radial surfaces 246 may be angled toward the first end 224 of housing 212.

Figure 13A:
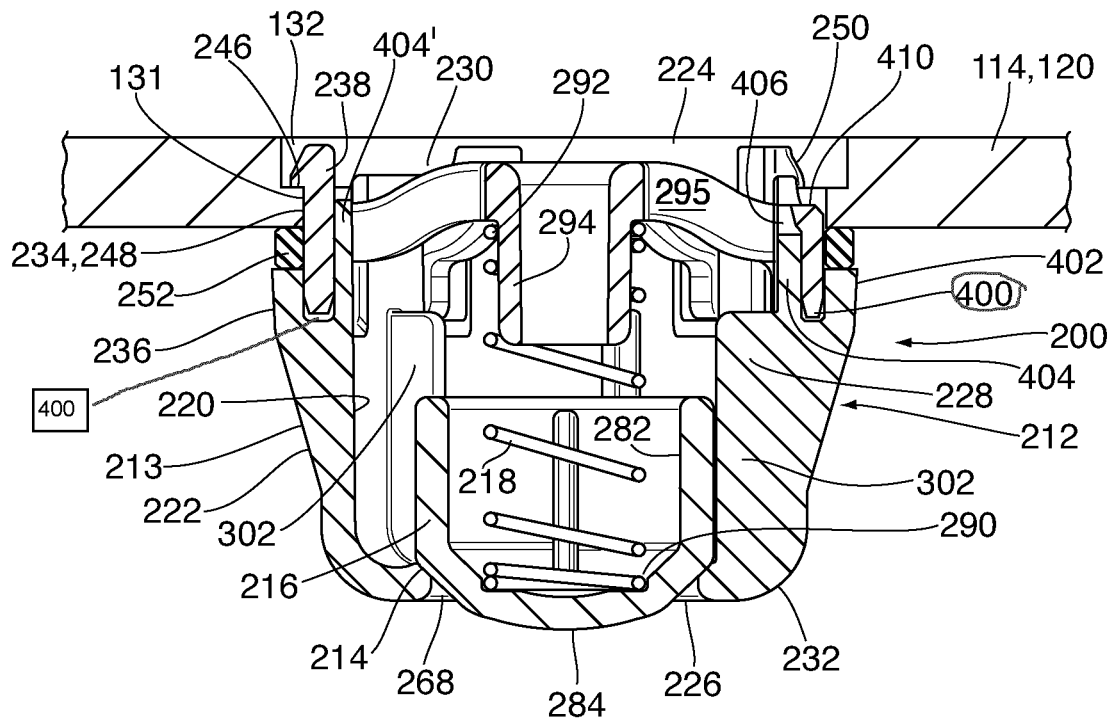
FIGS. 13A and 13B are a cross-section along line 13-13' of FIG. 12, showing the anti-drain valve in the closed and opened positions respectively.
Figure 13B:
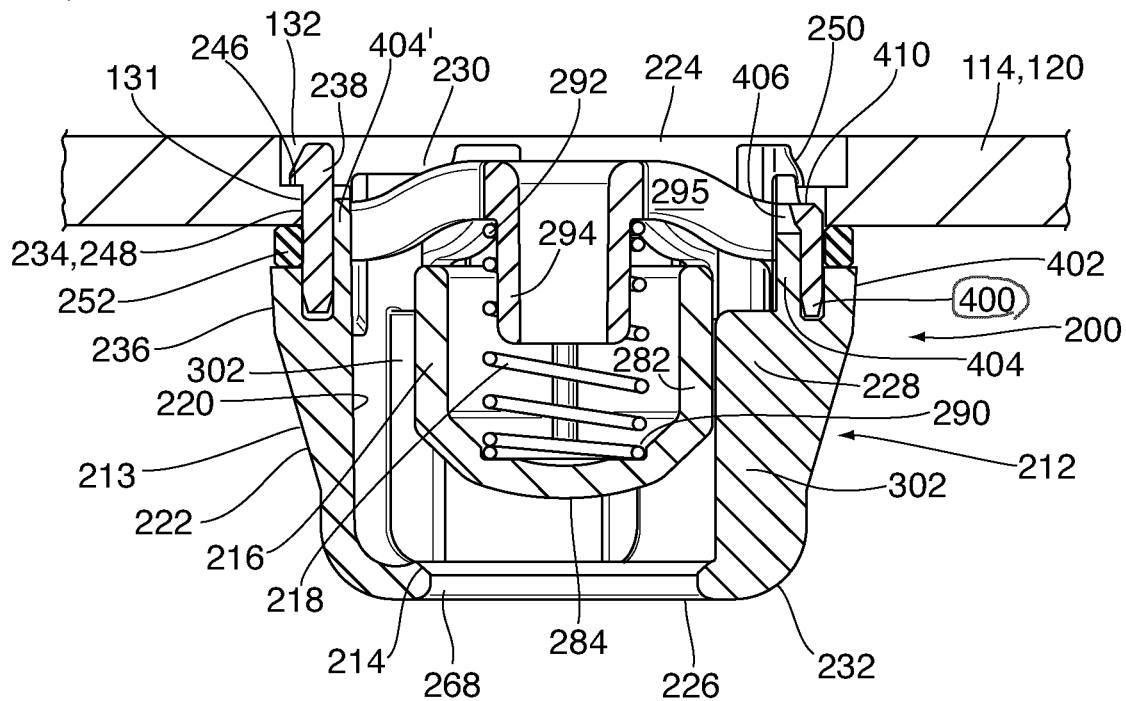

The first and second radial surfaces 237, 246 are spaced from each other by an axial distance which is slightly greater than a thickness of the inner peripheral edge 131 of the oil inlet opening 132 which, in the present embodiment, is less than the thickness of the second adapter plate 120. Each of the detents 238 defines a groove 248 which is sized and shaped to receive and retain the inner peripheral edge 131 of the oil inlet opening 132, the groove 248 being defined by the first axial surface 234, the first radial surface 237 and the second radial surface 246. FIG. 13 shows the inner peripheral edge 131 of the oil inlet opening 132 received and retained within the groove 248.

The base 242 of each detent 238 is inwardly bendable by an extent such that the tips 244 of the detents 238 can be pushed inwardly by the application of moderate pressure, substantially flush with the first axial surface 234. This permits the detents 238 to bend inwardly when the first end 224 of housing 212 is inserted into the oil inlet opening 132 by exerting axial pressure on the housing 212. Furthermore, the resilience of the detents 238 permits them to spring back to the unbent, relaxed position once the tips 244 pass through opening 132. Thus, the first portion 230 of the housing 212 forms an interference fit or snap fit with the oil inlet opening 132, and resists withdrawal of the valve 200 from the opening 132 of second adapter plate 120.

It will be appreciated that the formation of detents 238 at the first end 224 of the valve 200 is simpler where the housing 212 is formed from plastic, and would be more difficult and costly where the housing 212 is formed from metal. Furthermore, the resilience of plastic detents 238 is expected to be better than that of detents of comparable (radial) thickness formed in a metal housing.

To ease insertion of the valve 200 into opening 132, the tip 244 of each detent 238 may have a chamfered surface 250 which is angled inwardly between the second radial surface 46 and the first end 24 of the housing 12. As a result, the first end 24 of the housing 12 has a diameter which is less than the inside diameter of the oil inlet opening 132, permitting it to be inserted into the opening 132.

The anti-drain valve 200 also includes means for providing a fluid-tight seal between the valve housing 212 and the second adapter plate 120. In this regard, the valve 200 further comprises a first resilient sealing element 252 which, in the illustrated embodiment, comprises an O-ring or a profiled gasket having an inside diameter slightly greater than the diameter of the first axial surface 234, and an outside diameter less than the diameter of the second axial surface 236.

The sealing element 252 may be retained within the groove 248 or it may be partly housed in a depression (not shown), corresponding to depression 54 described above with reference to valve 10, and shown in FIG. 6. The dimensions of the sealing element 252 are such that it will be compressed between the first radial surface 237 and the second adapter plate 120 at or adjacent to the inner peripheral edge 131 of the oil inlet opening 132 as shown in FIG. 13. The compression of the sealing element 52 brings it into intimate sealing contact with both the housing 212 and the second adapter plate 120, thereby providing a fluid-tight seal between the second adapter plate 120 and the housing 212 of valve 200.

An annular valve seat 214 is defined proximate to the second end 226 of housing 212, in the second portion 232 thereof. The valve seat 214 defines an oil inlet opening 268 through which the valve 200 receives oil from the oil outlet port of the transmission or engine housing.

Valve 200 further comprises a generally cup-shaped piston 216 having a first or inner surface 282 facing toward the first end 224 of housing 212, and a second or outer surface 284 facing toward the second end 226 of housing 212. The second surface 284 is adapted to sealingly engage an annular sealing surface of the valve seat 214.

The first surface 282 of piston 216 is in the form of a hollow cup which is adapted to engage and receive the first end 290 of a biasing member 218, comprising an axially-extending coil spring. The biasing member 218 has a second end 292 which is supported by an axially-extending tubular support member 294 centrally located in housing 212 and forming part of the first portion 230 of housing 212. The tubular support member 294 is at least partially received inside the second end 292 of biasing member 218. The biasing member 218 is under compression between the piston 216 and the support member 294, and biases the piston 216 toward the closed position shown in FIG. 13, wherein the outer surface 284 sealingly engages the valve seat 214 to prevent oil from entering the valve 200 through oil inlet opening 268. The biasing member is axially compressible in response to a predetermined fluid pressure applied to the second surface 284 of piston 216 so as to cause the valve 200 to open.

The tubular support member 294 forms part of support structure 228 and the base of support member 294 is attached to the inner surface 220 of housing 212, in the first portion 230 thereof, through a plurality of radially-extending webs 295.

The support structure 228 further comprises a plurality of elongate, axially-extending piston guide members 302 in the form of fins projecting radially inwardly from the inner surface 220 of housing 212, in the second portion 232 thereof. The guide members 302 each have an axially-extending inner edge which is in engagement with or in close proximity to the outer surface 284 of the piston 216, and more specifically a cylindrically-shaped portion of the outer surface 284, which forms an axially-extending sidewall of piston 216. The guide members 302 are circumferentially spaced apart along the inner surface 220 of housing 212 and cooperate to guide and support the piston 216 as it moves axially toward and away from the valve seat 214.

Figure 14:
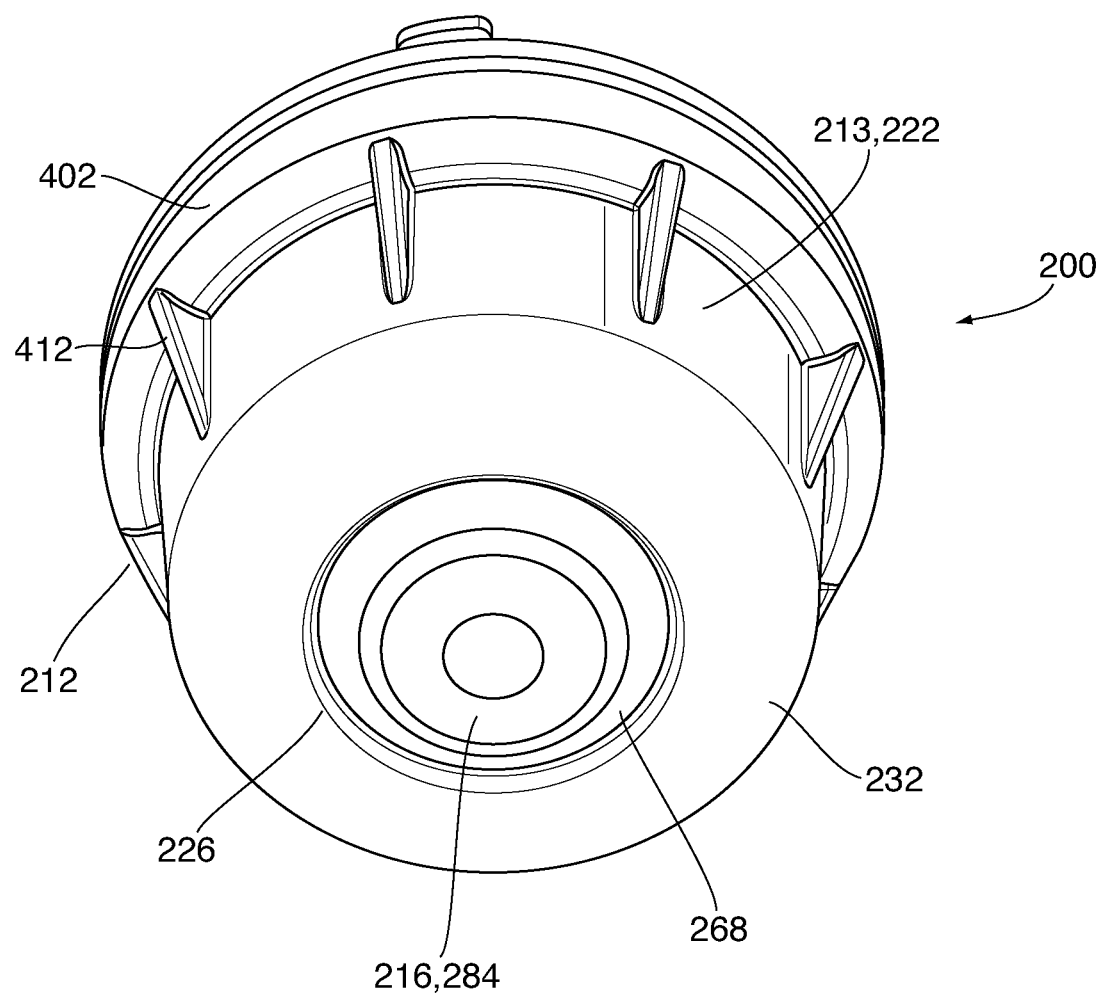
FIG. 14 is a bottom perspective view of the anti-drain valve of FIG. 11.

When sufficient oil pressure acts upon the exposed portion of the piston 216, i.e. the portion of piston 216 which is visible through the oil inlet opening 268 in FIG. 14, the piston 216 is pushed out of engagement with the valve seat 214, against the biasing force of biasing member 218, thereby opening the oil inlet opening 268 and permitting oil to enter the valve 200. The oil then flows through the interior of valve 200, between the guide members 302 spacing the piston 216 from the inner surface 220 of housing 212, and exits the valve 200 by flowing between the radial webs 295 at the first end 224 of housing 212.

As mentioned above, the housing 212 of valve 200 comprises first and second portions 230, 232. The two-piece construction of housing 212 permits assembly of the valve 200 by first forming a sub-assembly comprising the piston 216, biasing member 218 and first portion 230 of housing 212, inserting the piston 216 through the open top of the second portion 232 of housing, and pushing the first and second portions 230, 232 of housing 212 together to join portions 230, 232 and simultaneously compress the biasing member 218. Where a sealing element 252 is provided, it may be inserted into groove 248 after assembly of housing 212, or it may be placed on first radial surface 237 before assembly of the housing 212.

Figure 15:
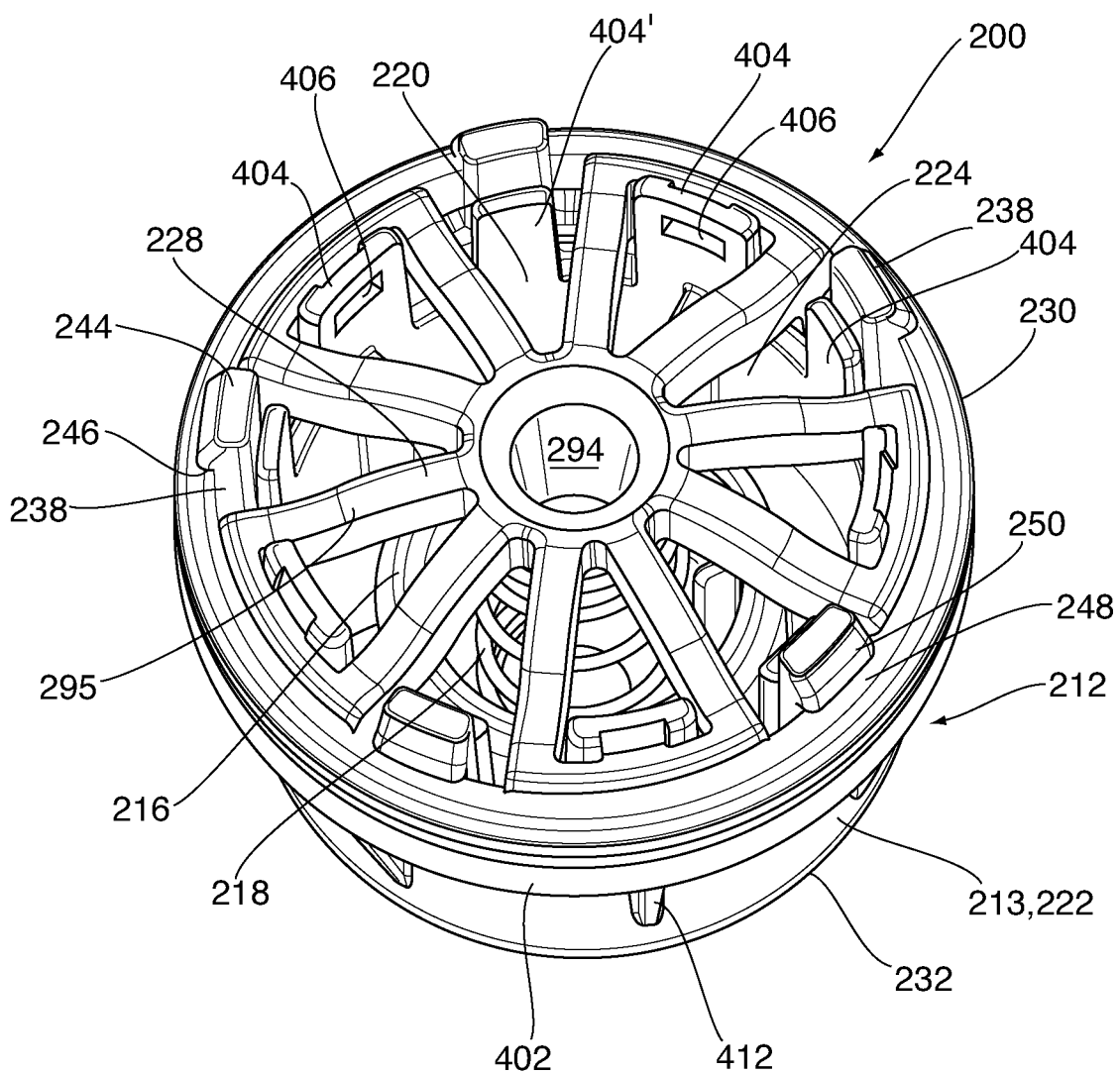
FIG. 15 is a top perspective view of the anti-drain valve of FIG. 11.

The first and second portions 230, 232 of housing 212 are configured to lock together in substantially sealed engagement with one another. For example, in the illustrated embodiment, a circumferential groove 400 is provided at the open top of the second portion 232 of housing 212. The groove 400 is located inwardly of the radially outwardly extending lip 402 of second portion 232, and is located between lip 402 and a plurality of axially upwardly extending fingers 404 extending above the lip 402 along the inner surface 220 of housing 212. The fingers 404 are spaced apart along the circumference of inner surface 220, and at least some of the fingers 404 are provided with apertures 406 proximate to their free ends. As shown in FIG. 15, the fingers 404 which lack apertures (labeled 404' in the drawings) engage and support the inner surfaces of detents 238, thereby helping to prevent the valve 200 from becoming detached from the base plate assembly 114.

The first portion 230 of housing 212 is in the form of a cylindrical ring 408 defining a portion of the outer wall 213 of housing 212. In particular, the cylindrical ring 408 has an inner surface partly defining the inner surface 220 of the generally cylindrical outer wall 213, and an outer surface defining the first axial surface 234. The cylindrical ring 408 carries the detents 238 as upward extensions of the cylindrical ring 408. The plurality of radial webs 295 project inwardly from the inner surface of cylindrical ring 408, toward the base of the tubular support member 294. Provided at spaced intervals along the inner surface of the cylindrical ring 408, between adjacent webs 295, are inwardly projecting lugs 410 which are sized and located so as to be received in the apertures 406 of fingers 404, so as to lock together the first and second portions 230, 232 of housing 212.

To assemble the housing 212, the cylindrical ring 408 of the first portion is brought into engagement with the groove 400 of the second portion, such that a lower portion of cylindrical ring 408 becomes received in the groove 400. Simultaneously, the fingers 404 of second portion are received in the spaces between adjacent webs 295, it being appreciated that the spaces between fingers 404 are sufficiently wide to receive the webs 295, as can be seen from FIG. 15. It will also be appreciated that the fingers 404 are somewhat resilient, to permit them to bend radially inwardly by a sufficient distance to permit the tops of fingers 404 to slide over the lugs 410 during assembly of valve 200.

Although the invention has been described in connection with certain embodiments, it is not restricted thereto. Rather, the invention includes all embodiments which may fall within the scope of the following claims.

What is claimed is:

1. An anti-drain valve for a plate cooler having a base plate with an oil opening, the anti-drain valve comprising:
   (a) a plastic housing having a generally cylindrical outer wall with an inner surface and an outer surface, open first and second ends, and an inner support structure integrally formed with the outer wall and attached to the inner surface thereof;
   (b) a valve seat proximate to the second end of the housing;
   (c) a piston located within the support structure and axially movable toward and away from the valve seat;
   (d) a biasing member located within the support structure and biasing the piston toward the valve seat; and
   (e) a first resilient sealing element between the housing and the base plate;
   wherein the outer wall of the housing comprises a first portion and an adjacent second portion, the first portion being proximate to the first end of the housing and defining a first axial surface having a first outside diameter which is smaller than an inside diameter of the oil opening of the base plate, and the second portion being distal to the first end of the housing and defining a second axial surface having a second outside diameter which is larger than the inside diameter of the oil opening;
   wherein the first portion of the housing further defines a plurality of inwardly bendable detents, each of the detents being defined by a pair of slots through the outer wall and proximate to the first end of the housing; and wherein each of the detents has a tip projecting radially outwardly from the first axial surface.

2. The anti-drain valve according to claim 1, wherein the housing further comprises a first radial surface extending outwardly from the first axial surface to the second axial surface; and wherein the housing further comprises a plurality of second radial surfaces defined by said detents, wherein the tip of each said detent projects radially outwardly from the first axial surface along one of said second radial surfaces; and wherein the first radial surface is axially spaced from each of the second radial surfaces by a distance which is slightly greater than a thickness of the base plate at an inner peripheral edge of the oil opening, such that a groove for receiving and retaining the inner peripheral edge is defined by the first axial surface, the first radial surface, and the second radial surface of each of said detents.

3. The anti-drain valve according to claim 1, wherein the first resilient sealing element is provided in said groove.

4. The anti-drain valve according to claim 3, wherein the first resilient sealing element comprises a first annular sealing ring.

5. The anti-drain valve according to claim 4, wherein the first annular sealing ring is partially housed in a depression in the first radial surface; and wherein the distance between the first radial surface and the second radial surfaces is such that the first annular sealing ring is compressed between the first radial surface and a surface of the base plate adjacent to the inner peripheral edge of the oil opening, when the inner peripheral edge of the oil opening is received in said groove.

6. The anti-drain valve according to claim 5, wherein the tip of each of the detents has a chamfered surface which is angled inwardly between the second radial surface and the first end of the housing, such that the first end of the housing has a diameter which is less than the inside diameter of the oil opening.

7. The anti-drain valve according to claim 1, wherein the piston has a first surface facing toward the first end of the housing, and a second surface facing toward the second end of the housing;

wherein the second surface of the piston is adapted to sealingly engage the valve seat; and wherein the first surface of the piston is adapted to engage the biasing member.

8. The anti-drain valve according to claim 7, wherein the biasing member comprises an axially extending coil spring having a first end and a second end, the first end engaging the first surface of the piston, the coil spring being compressible in response to a predetermined fluid pressure applied to the second surface of the piston;

wherein the support structure includes an axially extending tubular support member which engages and retains the second end of the coil spring.

9. The anti-drain valve according to claim 8, wherein the first surface of the piston is in the form of a hollow cup which is adapted to engage and receive the first end of the coil spring, and wherein the tubular support member is at least partially received inside the second end of the coil spring; and wherein the coil spring is under compression between the piston and the tubular support member, and biases the piston toward a closed position of the valve.

10. The anti-drain valve according to claim 8, wherein the support structure further comprises a plurality of piston guide members extending axially within the housing, wherein the piston guide members are in engagement with or in close proximity to the second surface of the piston;

wherein the piston guide members are spaced inwardly from the inner surface of the cylindrical outer wall of the housing.

11. The anti-drain valve according to claim 8, wherein the tubular support member is attached to the inner surface of the generally cylindrical outer wall through a plurality of radially-extending webs, wherein the webs are separated by spaces.

12. The anti-drain valve according to claim 1, wherein the second portion of the housing is generally cup-shaped, having an open top with a radially outwardly extending lip, and a central aperture in its bottom surface defining an oil inlet opening;

wherein the first portion of the housing includes a cylindrical ring having a lower portion which is received in the groove, wherein the cylindrical ring has an inner surface partly defining the inner surface of the generally cylindrical outer wall, and an outer surface defining the first axial surface.

13. The anti-drain valve according to claim 12, wherein the circumferential groove is located between the lip and a plurality of axially upwardly extending fingers extending above the lip along the inner surface of the cylindrical ring;

wherein at least some of the fingers are provided with apertures proximate to their free ends, wherein the apertures are adapted to receive inwardly projecting lugs projecting inwardly from the inner surface of the cylindrical ring, and located between adjacent pairs of said radial webs, wherein the lugs are sized and located so as to be received in the apertures of the fingers, to lock together the first and second portions of the housing; and wherein at least some of the fingers engage and support inner surfaces of the detents.

14. The anti-drain valve according to claim 1, wherein the valve seat is formed on a first end surface of a cylindrical ring which also has a second end surface, an inner cylindrical surface and an outer cylindrical surface;

wherein the outer cylindrical surface of the cylindrical ring has a diameter which is less than a diameter of the inner surface of the cylindrical outer wall of the housing; and wherein the cylindrical ring is at least partially received and retained within the second end of the housing.

15. The anti-drain valve according to claim 14, wherein the cylindrical ring forms an interlocking connection with the housing.

16. The anti-drain valve according to claim 14, wherein the first end surface of the cylindrical ring is provided with a second resilient sealing element; and wherein the second resilient sealing element is positioned such that it contacts the piston.

17. The anti-drain valve according to claim 16, wherein the second resilient sealing element comprises a second annular sealing ring which is partially housed in an annular groove in the first end surface of the cylindrical ring; and wherein the second annular sealing ring is retained between the first end surface of the cylindrical ring and the inner support structure of the housing.

18. A heat exchanger module comprising:
(a) an anti-drain valve according to claim 1;
(b) a heat exchanger having a fluid inlet manifold; and
(c) a base plate having a top surface and a bottom surface, wherein the top surface is attached to the heat exchanger, and the base plate has a fluid inlet opening in flow communication with the fluid inlet manifold of the heat exchanger;
wherein the first resilient sealing element is compressed between the first radial surface and the bottom surface of the base plate, adjacent to an inner peripheral edge of the fluid inlet opening, and is in sealed engagement with the base plate and the first radial surface.

19. The heat exchanger module according to claim 18, wherein the bottom surface of the base plate is provided with a chamfer immediately adjacent to the fluid inlet opening, the provided with a chamfer extending inwardly from the bottom surface toward the top surface of the base plate, so as to form a conical sealing surface.

\* \* \* \* \*